United States Patent
Saha et al.

(10) Patent No.: US 11,979,919 B2
(45) Date of Patent: May 7, 2024

(54) FLEXIBLE RANDOM ACCESS CHANNEL CONFIGURATIONS

(71) Applicant: QUALCOMM Incorporated, San Diego, CA (US)

(72) Inventors: Chiranjib Saha, San Diego, CA (US); Alberto Rico Alvarino, San Diego, CA (US); Le Liu, Fremont, CA (US); Umesh Phuyal, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/478,765

(22) Filed: Sep. 17, 2021

(65) Prior Publication Data

US 2023/0100539 A1    Mar. 30, 2023

(51) Int. Cl.
*H04W 74/08* (2009.01)
*H04L 27/26* (2006.01)
(Continued)

(52) U.S. Cl.
CPC ..... *H04W 74/0841* (2013.01); *H04L 27/2607* (2013.01); *H04W 72/0453* (2013.01); *H04W 74/0866* (2013.01)

(58) Field of Classification Search
CPC ......... H04W 74/0833; H04W 74/0841; H04W 74/08; H04W 74/0866; H04W 74/00;
(Continued)

(56) References Cited

U.S. PATENT DOCUMENTS

| 2008/0168114 A1* | 7/2008 | Han | H04L 1/0023 |
| | | | 708/209 |
| 2013/0012219 A1* | 1/2013 | Fischer | H04W 74/004 |
| | | | 455/450 |

(Continued)

FOREIGN PATENT DOCUMENTS

| CN | 113711680 | * 11/2011 | ............ H04W 74/00 |
| CN | 117044324 | * 11/2023 | |

(Continued)

OTHER PUBLICATIONS

International Search Report and Written Opinion—PCT/US2022/043890—ISA/EPO—dated Feb. 24, 2023 (2106650WO).
(Continued)

*Primary Examiner* — Warner Wong
(74) *Attorney, Agent, or Firm* — Holland & Hart LLP

(57) ABSTRACT

Methods, systems, and devices for wireless communications are described. A user equipment (UE) may communicate with a base station in a wireless communications system. The UE may perform a random access procedure to communicate with the base station. The base station may configure the UE with different sets of preamble parameters for different types of UEs. The UE may generate a random access preamble based on the sets of preamble parameters according to the type of the UE. The base station may indicate a location of the base station to the UE. The UE may identify a location of the UE. The UE may determine a pre-compensation timing based on a distance from the two locations. The UE and the base station may transmit subsequent communication according to the random access preamble, the pre-compensation timing, or any combination thereof.

26 Claims, 19 Drawing Sheets

(51) Int. Cl.
*H04W 72/0453* (2023.01)
*H04W 74/0833* (2024.01)

(58) Field of Classification Search
CPC . H04W 74/008; H04W 72/04; H04W 72/044; H04W 72/0453; H04L 27/2602; H04L 27/2605; H04L 27/2607; H04L 5/0051; H04L 2027/0087; H04L 2027/0095; H04L 27/26136

See application file for complete search history.

(56) References Cited

U.S. PATENT DOCUMENTS

| | | | | |
|---|---|---|---|---|
| 2013/0215861 | A1* | 8/2013 | Nam | H04W 56/0005 370/329 |
| 2018/0375698 | A1* | 12/2018 | Zhang | H04W 74/006 |
| 2019/0159248 | A1* | 5/2019 | Shin | H04L 27/2602 |
| 2019/0215877 | A1* | 7/2019 | Qian | H04L 27/0014 |
| 2020/0022038 | A1* | 1/2020 | Han | H04W 74/006 |
| 2020/0191946 | A1* | 6/2020 | Kalyandurg | G01S 13/955 |
| 2020/0229244 | A1* | 7/2020 | Yan | H04W 74/0833 |
| 2020/0374925 | A1* | 11/2020 | Su | H04B 1/713 |
| 2021/0036904 | A1* | 2/2021 | Wu | H04L 5/00 |
| 2021/0037452 | A1 | 2/2021 | Tsuda et al. | |
| 2022/0053577 | A1* | 2/2022 | Chai | H04W 72/0453 |
| 2022/0150858 | A1* | 5/2022 | Ren | H04B 17/104 |
| 2022/0183077 | A1* | 6/2022 | Lu | H04W 74/0833 |
| 2022/0217782 | A1 | 7/2022 | Nishio et al. | |
| 2022/0330350 | A1* | 10/2022 | Wang | H04W 72/0453 |
| 2023/0044554 | A1* | 2/2023 | Huang | H04L 5/0053 |
| 2023/0180300 | A1* | 6/2023 | Lin | H04W 48/16 370/329 |
| 2023/0199859 | A1 | 6/2023 | Li et al. | |
| 2023/0292364 | A1* | 9/2023 | Mu | H04W 74/0833 |

FOREIGN PATENT DOCUMENTS

| | | | | |
|---|---|---|---|---|
| WO | WO-2018012618 | A1 * | 1/2018 | ....... H04L 27/26025 |
| WO | WO-2018175252 | A1 | 9/2018 | |
| WO | WO-2019067277 | A1 | 4/2019 | |
| WO | WO-2022030281 | A1 * | 2/2022 | .......... H04W 56/005 |

OTHER PUBLICATIONS

Partial International Search Report—PCT/US2022/043890—ISA/EPO—dated Jan. 3, 2023 (2106650WO).

* cited by examiner

FLEXIBLE RANDOM ACCESS CHANNEL CONFIGURATIONS

FIELD OF TECHNOLOGY

The following relates to wireless communications, including flexible random access channel configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, UEs may perform random access procedures

SUMMARY

The described techniques relate to improved methods, systems, devices, and apparatuses that support flexible random access channel configurations. Generally, the described techniques provide for user equipments (UEs) performing a random access procedure in communication with a base station in a wireless communications system.

In some cases, the base station may configure the UE with different sets of preamble parameters for different types of UEs (e.g., aerial UEs versus terrestrial UEs). The UE may generate a random access preamble based on the sets of preamble parameters according to the type of the UE.

Additionally, or alternatively, in some examples, the base station may indicate a location of the base station to the UE. The UE may identify a location of the UE. The UE may determine a pre-compensation timing based on a distance between the two locations. The UE may transmit a random access preamble according to the determined pre-compensation timing in a first random access message. The UE may transmit an indication of the pre-compensation timing to the base station (e.g., as part of a first random access message (message A) in a two-step random access procedure or a third random access message (message 3) in a four-step random access procedure). The UE and base station may transmit subsequent communication according to a timing (e.g., an updated timing advance) that is based at least in part on the pre-compensation timing.

A method for wireless communications at a user equipment (UE) is described. The method may include receiving, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters, generating a random access preamble based on the first set of random access preamble parameters or the second set of random access preamble parameters, and transmitting the random access preamble to the base station.

An apparatus for wireless communications at a UE is described. The apparatus may include a processor, memory coupled with the processor, and instructions stored in the memory. The instructions may be executable by the processor to cause the apparatus to receive, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters, generate a random access preamble based on the first set of random access preamble parameters or the second set of random access preamble parameters, and transmit the random access preamble to the base station.

Another apparatus for wireless communications at a UE is described. The apparatus may include means for receiving, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters, means for generating a random access preamble based on the first set of random access preamble parameters or the second set of random access preamble parameters, and means for transmitting the random access preamble to the base station.

A non-transitory computer-readable medium storing code for wireless communications at a UE is described. The code may include instructions executable by a processor to receive, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters, generate a random access preamble based on the first set of random access preamble parameters or the second set of random access preamble parameters, and transmit the random access preamble to the base station.

In some examples of the method, apparatuses, and non-transitory computer-readable medium described herein, receiving the system information including the first set of random access preamble parameters and the second set of random access preamble parameters may include operations, features, means, or instructions for receiving, in the system information, an indication of a first set of cyclic shifts for generating random access preambles associated with UEs of the first type and an indication of a second set of cyclic shifts for generating random access preambles associated with UEs of the second type, the second set of cyclic shifts different than the first set of cyclic shifts.

In some examples of the method, apparatuses, and non-transitory computer-readable medium described herein, each cyclic shift of the second set of cyclic shifts for generating random access preambles associated with UEs of the second type differs from each other cyclic shift of the second set of cyclic shifts by at least a first amount and each cyclic shift of the first set of cyclic shifts for generating random access preambles associated with UEs of the first type differs from each other cyclic shift of the first set of cyclic shifts by at least a second amount that may be greater than the first amount.

In some examples of the method, apparatuses, and non-transitory computer-readable medium described herein, receiving the system information including the first set of random access preamble parameters and the second set of random access preamble parameters may include operations, features, means, or instructions for receiving, in the system information, an indication of a first set of frequency resources for transmitting random access preambles associated with UEs of the first type and an indication of a second set of frequency resources for transmitting random access preambles associated with UEs of the second type, the second set of frequency resources different than the first set of frequency resources.

In some examples of the method, apparatuses, and non-transitory computer-readable medium described herein, receiving the system information including the first set of random access preamble parameters and the second set of random access preamble parameters may include operations, features, means, or instructions for receiving, in the system information, an indication of a first set of time resources for transmitting random access preambles associated with UEs of the first type and an indication of a second set of time resources for transmitting random access preambles associated with UEs of the second type, the second set of time resources different than the first set of time resources.

In some examples of the method, apparatuses, and non-transitory computer-readable medium described herein, receiving the system information including the first set of random access preamble parameters and the second set of random access preamble parameters may include operations, features, means, or instructions for receiving, in the system information, an indication of a first set of root sequences for generating random access preambles associated with UEs of the first type and an indication of a second set of root sequences for generating random access preambles associated with UEs of the second type, the second set of root sequences different than the first set of root sequences.

In some examples of the method, apparatuses, and non-transitory computer-readable medium described herein, receiving the system information including the first set of random access preamble parameters and the second set of random access preamble parameters may include operations, features, means, or instructions for receiving, within the system information, a first information element including random access preamble parameters specific to UEs of the first type and a second information element including different random access preamble parameters specific to UEs of the second type.

In some examples of the method, apparatuses, and non-transitory computer-readable medium described herein, the UEs of the first type include aerial UEs, and the UEs of the second type include terrestrial UEs.

In some examples of the method, apparatuses, and non-transitory computer-readable medium described herein, an aerial UE includes a UE having an aerial network subscription, a UE located above a threshold height, a UE that communicates with the base station via a beam that satisfies a threshold beam angle, a UE communicating via a random access resource designated for aerial UEs, a UE communicating via a random access resource associated with a synchronization signal block corresponding to a beam that satisfies a threshold beam angle, or any combination thereof, and a terrestrial UE includes a non-aerial UE.

A method for wireless communications at a base station is described. The method may include transmitting, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters, receiving, from the UE based on transmitting the system information, a random access preamble based on the first set of random access preamble parameters or the second set of random access preamble parameters, and transmitting, to the UE, a random access message responsive to the random access preamble.

An apparatus for wireless communications at a base station is described. The apparatus may include a processor, memory coupled with the processor, and instructions stored in the memory. The instructions may be executable by the processor to cause the apparatus to transmit, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters, receive, from the UE based on transmitting the system information, a random access preamble based on the first set of random access preamble parameters or the second set of random access preamble parameters, and transmit, to the UE, a random access message responsive to the random access preamble.

Another apparatus for wireless communications at a base station is described. The apparatus may include means for transmitting, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters, means for receiving, from the UE based on transmitting the system information, a random access preamble based on the first set of random access preamble parameters or the second set of random access preamble parameters, and means for transmitting, to the UE, a random access message responsive to the random access preamble.

A non-transitory computer-readable medium storing code for wireless communications at a base station is described. The code may include instructions executable by a processor to transmit, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters, receive, from the UE based on transmitting the system information, a random access preamble based on the first set of random access preamble parameters or the second set of random access preamble parameters, and transmit, to the UE, a random access message responsive to the random access preamble.

In some examples of the method, apparatuses, and non-transitory computer-readable medium described herein, transmitting the system information including the first set of random access preamble parameters and the second set of random access preamble parameters may include operations, features, means, or instructions for transmitting, in the system information, an indication of a first set of cyclic shifts for generating random access preambles associated with UEs of the first type and an indication of a second set of cyclic shifts for generating random access preambles associated with UEs of the second type, the second set of cyclic shifts different than the first set of cyclic shifts.

In some examples of the method, apparatuses, and non-transitory computer-readable medium described herein, each cyclic shift of the second set of cyclic shifts for generating random access preambles associated with UEs of the second type differs from each other cyclic shift of the second set of cyclic shifts by at least a first amount and each cyclic shift of the first set of cyclic shifts for generating random access preambles associated with UEs of the first type differs from each other cyclic shift of the first set of cyclic shifts by at least a second amount that may be greater than the first amount.

In some examples of the method, apparatuses, and non-transitory computer-readable medium described herein, transmitting the system information including the first set of random access preamble parameters and the second set of random access preamble parameters may include operations, features, means, or instructions for transmitting, in the system information, an indication of a first set of frequency resources for transmitting random access preambles associated with UEs of the first type and an indication of a second set of frequency resources for transmitting random access preambles associated with UEs of the second type, the second set of frequency resources different than the first set of frequency resources.

In some examples of the method, apparatuses, and non-transitory computer-readable medium described herein, transmitting the system information may include operations, features, means, or instructions for transmitting, in the system information, an indication of a first set of time resources for transmitting random access preambles associated with UEs of the first type and an indication of a second set of time resources for transmitting random access preambles associated with UEs of the second type, the second set of time resources different than the first set of time resources.

In some examples of the method, apparatuses, and non-transitory computer-readable medium described herein, transmitting the system information including the first set of random access preamble parameters and the second set of random access preamble parameters may include operations, features, means, or instructions for transmitting, in the system information, an indication of a first set of root sequences for generating random access preambles associated with UEs of the first type and an indication of a second set of root sequences for generating random access preambles associated with UEs of the second type, the second set of root sequences different than the first set of root sequences.

In some examples of the method, apparatuses, and non-transitory computer-readable medium described herein, receiving the system information including the first set of random access preamble parameters and the second set of random access preamble parameters may include operations, features, means, or instructions for transmitting, within the system information, a first information element including random access preamble parameters specific to UEs of the first type and a second information element including different random access preamble parameters specific to UEs of the second type.

A method for wireless communications at a UE is described. The method may include receiving, from a base station, system information including an indication of a location of the base station, identifying a location of the UE, and transmitting, to the base station, a random access preamble at a time that is based on a distance between the location of the base station and the location of the UE.

An apparatus for wireless communications at a UE is described. The apparatus may include a processor, memory coupled with the processor, and instructions stored in the memory. The instructions may be executable by the processor to cause the apparatus to receive, from a base station, system information including an indication of a location of the base station, identify a location of the UE, and transmit, to the base station, a random access preamble at a time that is based on a distance between the location of the base station and the location of the UE.

Another apparatus for wireless communications at a UE is described. The apparatus may include means for receiving, from a base station, system information including an indication of a location of the base station, means for identifying a location of the UE, and means for transmitting, to the base station, a random access preamble at a time that is based on a distance between the location of the base station and the location of the UE.

A non-transitory computer-readable medium storing code for wireless communications at a UE is described. The code may include instructions executable by a processor to receive, from a base station, system information including an indication of a location of the base station, identify a location of the UE, and transmit, to the base station, a random access preamble at a time that is based on a distance between the location of the base station and the location of the UE.

Some examples of the method, apparatuses, and non-transitory computer-readable medium described herein may further include operations, features, means, or instructions for transmitting, to the base station, an indication of a first timing delay associated with the time at which the random access preamble may be transmitted, receiving, from the base station, an indication of a timing advance that may be based on a combination of the first timing delay and a second timing delay, the second timing delay independent of the time at which the random access preamble may be transmitted, and transmitting, to the base station while in a connected mode, uplink signaling in accordance with the timing advance.

Some examples of the method, apparatuses, and non-transitory computer-readable medium described herein may further include operations, features, means, or instructions for receiving, from the base station before transmitting the indication of the first timing delay, an indication of an initial timing advance that may be based on the second timing delay, where the timing advance includes an updated timing advance received after transmitting the indication of the first timing delay.

In some examples of the method, apparatuses, and non-transitory computer-readable medium described herein, a first message of a random access procedure includes the random access preamble, receiving the indication of the initial timing advance includes receiving, from the base station, a second message of the random access procedure that includes the indication of the initial timing advance, transmitting the indication of the first timing delay includes transmitting, to the base station, a third message of the random access procedure that includes the indication of the first timing delay, and receiving the indication of the timing advance includes receiving, from the base station, a fourth message of the random access procedure that includes an indication of the updated timing advance that may be based on the combination of the first timing delay and the second timing delay.

In some examples of the method, apparatuses, and non-transitory computer-readable medium described herein, a first message of a random access procedure includes the random access preamble and the indication of the first timing delay and receiving the indication of the timing advance includes receiving, from the base station, a second message of the random access procedure that includes the indication of the timing advance that may be based on the combination of the first timing delay and the second timing delay.

Some examples of the method, apparatuses, and non-transitory computer-readable medium described herein may further include operations, features, means, or instructions for receiving, from the base station, an indication of an adjustment factor for the time at which the random access preamble may be transmitted and adjusting the time at which the random access preamble may be transmitted based on the adjustment factor.

In some examples of the method, apparatuses, and non-transitory computer-readable medium described herein, the system information includes a system information block, a positioning system information block, or any combination thereof.

In some examples of the method, apparatuses, and non-transitory computer-readable medium described herein, the UE may be an aerial UE that may have an aerial network subscription, may be located above a threshold height, communicates with the base station via a beam that satisfies a threshold beam angle, communicates via a random access resource designated for aerial UEs, communicates via a random access resource associated with a synchronization signal block corresponding to a beam that satisfies a threshold beam angle, or any combination thereof and the instructions may be executable by the processor to cause the apparatus to transmit the random access preamble at the time that may be based on the distance between the location of the base station and the location of the UE based on the UE being an aerial UE.

A method for wireless communications at a base station is described. The method may include transmitting, to a UE, system information including an indication of a location of the base station, receiving, from the UE, a random access preamble at a time that is based on a distance between the location of the base station and a location of the UE, and transmitting, to the UE, a random access message responsive to the random access preamble.

An apparatus for wireless communications at a base station is described. The apparatus may include a processor, memory coupled with the processor, and instructions stored in the memory. The instructions may be executable by the processor to cause the apparatus to transmit, to a UE, system information including an indication of a location of the base station, receive, from the UE, a random access preamble at a time that is based on a distance between the location of the base station and a location of the UE, and transmit, to the UE, a random access message responsive to the random access preamble.

Another apparatus for wireless communications at a base station is described. The apparatus may include means for transmitting, to a UE, system information including an indication of a location of the base station, means for receiving, from the UE, a random access preamble at a time that is based on a distance between the location of the base station and a location of the UE, and means for transmitting, to the UE, a random access message responsive to the random access preamble.

A non-transitory computer-readable medium storing code for wireless communications at a base station is described. The code may include instructions executable by a processor to transmit, to a UE, system information including an indication of a location of the base station, receive, from the UE, a random access preamble at a time that is based on a distance between the location of the base station and a location of the UE, and transmit, to the UE, a random access message responsive to the random access preamble.

Some examples of the method, apparatuses, and non-transitory computer-readable medium described herein may further include operations, features, means, or instructions for estimating a propagation delay for signaling between the base station and the UE based on receiving the random access preamble, receiving, from the UE, an indication of a first timing delay associated with the time at which the random access preamble may be received, transmitting, to the UE, an indication of a timing advance that may be based on a combination of the first timing delay and the estimated propagation delay, and receiving, from the UE, uplink signaling in accordance with the timing advance.

Some examples of the method, apparatuses, and non-transitory computer-readable medium described herein may further include operations, features, means, or instructions for transmitting, to the UE before receiving the indication of the first timing delay, an indication of an initial timing advance that may be based on the estimated propagation delay, where the timing advance includes an updated timing advance transmitted after receiving the indication of the first timing delay.

In some examples of the method, apparatuses, and non-transitory computer-readable medium described herein, a first message of a random access procedure includes the random access preamble, transmitting the indication of the initial timing advance includes transmitting, to the UE, a second message of the random access procedure that includes the indication of the initial timing advance, the second message of the random access procedure including the random access message responsive to the random access preamble, receiving the indication of the first timing delay includes receiving, from the UE, a third message of the random access procedure that includes the indication of the first timing delay, and transmitting the indication of the timing advance includes transmitting, to the UE, a fourth message of the random access procedure that includes the indication of the timing advance that may be based on the combination of the first timing delay and the estimated propagation delay.

In some examples of the method, apparatuses, and non-transitory computer-readable medium described herein, a first message of a random access procedure includes the random access preamble and the indication of the first timing delay and transmitting the indication of the timing advance includes transmitting, to the UE, a second message of the random access procedure that includes the indication of the timing advance that may be based on the combination of the first timing delay and the estimated propagation delay, the second message of the random access procedure including the random access message responsive to the random access preamble.

In some examples of the method, apparatuses, and non-transitory computer-readable medium described herein, the system information includes a system information block, a positioning system information block, or a combination thereof.

DETAILED DESCRIPTION

Figure 1:
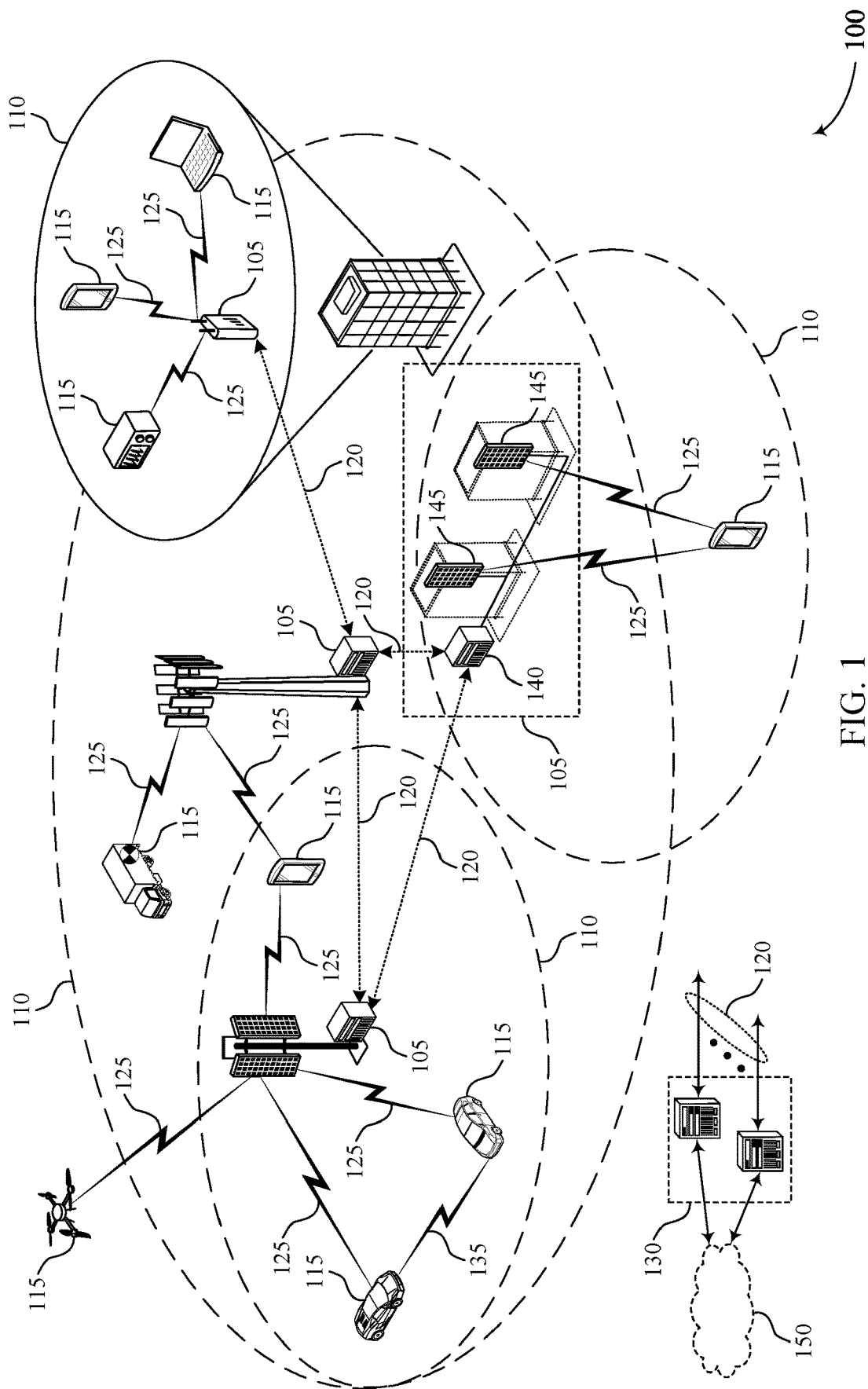
FIG. 1 illustrates an example of a wireless communications system that supports flexible random access channel configurations in accordance with aspects of the present disclosure.

A wireless communications system may support random access procedures. When performing a random access procedure (e.g., to establish a connection with a base station, as part of a handover, or the like), a user equipment (UE) may transmit a random access message including a preamble to the base station (e.g., message 1 of a four-step random access procedure, or message A of a two-step random access procedure). A base station may transmit random access parameters to a UE, for example, in a system information message (e.g., a system information block (SIB)). The random access parameters may include a set of supported cyclic shifts for generating random access preambles, a root sequence for generating random access preambles, or the like. The UE may generate a random access preamble using one of the supported cyclic shifts, the root sequence, etc. Such random access preambles may be orthogonal to each other as generated by different UEs.

In some examples, different propagation delays for devices located at different places within a geographic coverage area of a cell may result in an amount of timing uncertainty. Such timing uncertainty may result in otherwise orthogonal sequences (e.g., random access preambles) interfering with each other. Timing uncertainty may be based on a worst case scenario (e.g., a worst case propagation delay caused by UEs located on the cell edge). If different cyclic shifts are different by an amount smaller than a threshold (e.g., an amount of time equal to a time uncertainty, a delay spread, and a guard interval, or any combination thereof), then random access preamble sequences may not be orthogonal to each other as estimated by the base station, resulting in failed random access procedures, system delays, or the like. To avoid such issues, a base station may configure UEs with a set of valid or supported cyclic shifts (e.g., a set of cyclic shifts that each differ from each other by at least a threshold amount). However, such supported cyclic shifts (e.g., the cyclic shifts that satisfy the threshold minimum difference) may be based on cell size (e.g., a worst case propagation delay based on the boundaries of the cell).

In some examples, a wireless communications system may support various types of UEs, such as terrestrial UEs and aerial UEs. Aerial UEs may potentially be located significantly farther away from the base station than a terrestrial UE (e.g., even further from a base station than a terrestrial UE located at the edge of a terrestrial cell). Thus, if an aerial UE generates a preamble using cyclic shifts supported by terrestrial UEs, the generated preamble may not be orthogonal to other preambles, or the delay for such signaling may be greater than expected by the base station. Additionally, or alternatively, if a single set of cyclic shifts are supported for both terrestrial UEs (e.g., in a relatively small geographic coverage area) and aerial UEs (in a relatively larger geographic coverage area), then the number of cyclic shifts in the set of cyclic shifts may be limited because the large potential separation distance of the aerial UEs may correspond to a large minimum difference between supported cyclic shifts (e.g., such that only a limited number of cyclic shifts satisfy the minimum difference between supported cyclic shifts). These scenarios may result in failed random access procedures, increased interference, increased system latency, and reduced user experience.

The techniques described herein provide flexible preamble configurations for different types of UEs. In some examples, a base station may transmit different RACH configurations (e.g., through system information, such as SIB type 1 (SIB 1)) for different UE types (e.g., aerial UEs versus terrestrial UEs). The RACH configurations may include, for example, different sets of parameters for the different types of UEs. For example, a first set of parameters (e.g., cyclic shifts, frequency resources, time resources, or root sequences for random access preambles) may be for terrestrial UEs, and a second set of parameters (e.g., cyclic shifts, frequency resources, time resources, or root sequences for random access preambles) may be for aerial UEs.

Techniques described herein may also, additionally or alternatively, provide for flexible timing of random access transmissions to compensate for greater propagation delays for aerial UEs. In some examples, the base station may indicate its position (e.g., as part of system information, such as SIB 1 or Positioning SIB), and an aerial UE may determine the distance between the two devices based on the received position of the base station and the position of the aerial UE. The aerial UE may determine a timing delay (e.g., a pre compensation timing) based on the determined distance between the two devices, and may transmit preambles according to the timing delay. For instance, an aerial UE may determine the timing delay, and may transmit a preamble earlier than a default timing by at least the timing delay (e.g., compensating for the delay introduced by the large propagation delay experienced by the aerial UE). In some examples, the aerial UE may transmit an indication of the timing delay to the base station (e.g., as part of a first random access message (e.g., random access message A, which may be referred to as MsgA) in a two-step random access procedure or a third random access message (e.g., random access message 3, which may be referred to as Msg3) in a four step random access procedure). The base station may apply this to an estimated propagation delay for the UE that the base station may calculate based on reception of uplink signaling, to more accurately indicate a timing advance (TA) for subsequent signaling.

Aspects of the disclosure are initially described in the context of wireless communications systems. Aspects of the disclosure are then described in the context of a two system diagrams, a process flow, a system diagram, and two process flows. Aspects of the disclosure are further illustrated by and described with reference to apparatus diagrams, system diagrams, and flowcharts that relate to flexible random access channel configurations.

FIG. 1 illustrates an example of a wireless communications system 100 that supports flexible random access channel configurations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or any combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the UE 115 may perform random access procedures for establishing communications between the UE 115 and the base station 105. RACH procedures may be based on a two-step RACH or a four-step RACH. A four-step RACH may include four random access messages. For example, the UE 115 may transmit a first random access message (e.g., random access message 1, which may be referred to as Msg1) to the base station 105. The random access message 1 may include a PRACH preamble message. The base station 105 may calculate a TA for time synchronization based on the random access message 1. The base station 105 may send a second random access message (e.g., random access message 2, which may be referred to as Msg2) to the UE 115. The random access message 2 may include the TA. The UE 115 may send back a third random access message (e.g., random access message 3, which may be referred to as Msg3) to the base station 105, and the base station 105 may finish the random access procedure by sending a fourth random access message (e.g., random access message 4, which may be referred to as Msg4) to the UE 115. A two-step RACH may include a first random access message (e.g., random access message A) sent by the UE 115 and a second random access message (e.g., random access message B, which may be referred to as MsgB) sent by the base station 105, where the random access message A includes similar data to the random access message 1 and the random access message 3 and the random access message B includes similar data to the random access message 2 and the random access message 4.

In some cases, a UE 115 may be defined as an aerial UE 115. A UE 115 may be an aerial UE based at least in part on one or more scenarios. The scenarios may be constructed by the union and intersection of at least the following items: an aerial subscription, a height of a UE 115, a base station 105 beam (identified by SSB or CSI-RS index) associated with random access, or any combination thereof. For example, an aerial UE may be a UE with aerial subscription, a UE with aerial subscription and above a height threshold, a UE with aerial subscription using random access resources associated with an uptilted beam (e.g., SSB index i), and/or a UE using random access resources associated with an uptilted beam (e.g., SSB index i). Therefore, another UE 115 (e.g., not an aerial UE) may be a UE with no aerial subscription, a UE with no aerial subscription or a UE with aerial subscription but that is currently below a height threshold, and/or other UE 115s. The different scenarios may be examples of an aerial UE and may not represent all of the possible definitions of an aerial UE. In some examples, as described herein, an aerial UE may compute pre-compensation timing ($t_{pre}$) for PRACH, identify system information parameters that are specific to UE-type (e.g., aerial UEs 115), or both.

In some examples a base station 105 may transmit random access parameters to a UE 115, for example, as part of system information (e.g., system information block (SIB)). The random access parameters may include a set of cyclic shifts for generating random access preambles, a root sequence for generating random access preambles, or the like. The UE 115 may generate a random access preamble according to a Zadoff-Chu (ZC) sequence. A set of random access preambles $x_{u,v}(t)$ may be generated according to equation 1 and equation 2. Accordingly, the random access preamble may be generated using:

$$x_u(i) = e^{-j\frac{\pi u i(i+1)}{L_{RA}}}, i = 0, 1, \ldots, L_{RA} - 1 \quad \text{Equation 1}$$

$$x_{u,v}(t) = x_u((n + C_v) \bmod L_{RA}) \quad \text{Equation 2}$$

where $L_{RA}$ represents a prime number, which is the length of the ZC sequence, u represents the sequence index, $C_v$ represents a cyclic shift. The frequency domain representation $y_{u,v}(n)$ of the preamble sequence may be generated according to Equation 3:

$$y_{u,v}(n) = \sum_{m=0}^{L_{RA}-1} x_{u,v}(m) e^{-j\frac{2\pi m n}{L_{RA}}} \quad \text{Equation 3}$$

where $L_{RA}$ is a prime number and represents a length of a ZC sequence, u is a root sequence index, $C_v$ is a cyclic shift. In some cases $L_{RA}$ may be based on a preamble format (e.g., 0, 1, 2, A1, etc.) derived from a parameter (e.g., system information parameters such as prach-ConfigurationIndex), u may be derived from a parameter (e.g., a system information parameter such as prach-RootSequenceIndex), and $C_v$ may be determined by one or more parameters (e.g., system information parameter such as zeroCorrelationZoneConfig and restricedSetConfig). In some examples a system information (e.g., SIB-1) may contain any combination of prach-ConfigurationIndex, prach-RootSequenceIndex, zeroCorrelationZoneConfig, and restricedSetConfig. In some cases, the SIB-1 may be broadcast in a cell such that only one random access preamble configuration is broadcast in the SIB-1. In some examples, the SIB-1 may indicate a set of supported cyclic shifts, and a specific cyclic shift for use by a particular UE 115 may be indicated via higher layer signaling. For example, an RRC parameter such as $N_{CS}$ may indicate a value from which a cyclic shift $C_v$ may be determined (e.g., $C_v$ may be a multiple of $N_{cs}$).

The ZC sequence (e.g., a ZC sequence of any length) may have an ideal cyclic autocorrelation, which may be represented by Equation 4:

$$\sum_{n=0}^{L_{RA}-1} x_u(n) x_u((n+\sigma) \bmod L_{RA}) = \delta(\sigma), 0 \leq \sigma < L_{RA} \quad \text{Equation 4:}$$

A cyclic shift generated according to a can be used to generate a sequence that is orthogonal to other preambles generated using other cyclic shifts. Any cyclic shift will generate an orthogonal sequence if the sequence length $L_{RA}$ is a prime number. Thus, each generated preamble sequence may be orthogonal as generated by the UE. However, as described herein, the base station may estimate the generated preamble sequence with some amount of uncertainty, such as uncertainty due to propagation delays or other factors. Thus, some preamble sequences, even if orthogonal as generated at a UE, may not be distinguishable (e.g., uniquely determinable, orthogonal as estimated) by the receiving device. The extent of uncertainty within which a receiving device may estimate a preamble sequence may depend on (e.g., be directly proportional to) a propagation delay (and hence a separation distance) between a transmitting device and the receiving device. Thus, in some examples, only some values of cyclic shifts may be supported within a cell, and how many or which cyclic shifts are supported may depend at least in part on a size of the area of the cell (e.g., a maximum separation distance between the base station and a UE within the cell). Supported cyclic shifts may each differ by a sufficient amount to result in any generated sequences that are transmitted within an area of the cell are orthogonal as estimated by the base station.

In some examples, a cyclic shift offset $N_{CS}$ is dimensioned such that a zero correlation zone of the sequences are orthogonal of the PRACH resources irrespective of any time uncertainty (such as channel delay spread, propagation delay, or the like). Ideally, a threshold (e.g., minimum) value of the $N_{CS}$ should be greater than a smallest multiple of sequence sample period, which may be more than the a threshold (e.g., maximum) delay spread, time uncertainty, or the like, of a UE 115 attempting random access, not yet synchronized with the network timing. Also, the $N_{CS}$ may take into account some additional guard samples to protect any spill-over from the receiving device. For example, if the value of the $N_{CS}$ is smaller than the combination of a time uncertainty (e.g., $$\frac{2d}{c},$$

which may correspond to a round-trip time (RTT) for communications between the UE 115 and the base station 105), a delay spread, and a guard interval, then there may be a high probability of contention. The time uncertainty may be related to a worst case propagation delay, which may be caused by the cell-edge UE 115. Thus, cell size may be a factor for the design of the $N_{CS}$. For example, large cells tend to have high $N_{CS}$, thus, large cells tend to have a relatively small number of cyclic prefixes to be used.

In some cases the random access parameters for determining the root sequences and their cyclic shifts in a PRACH preamble sequence set (e.g., an index to logical root sequence table, cyclic shift ($C_v$), and set type (unrestricted, restricted set A, or restricted set B)) may be configured by a SIB or in a dedicated manner. For example, if a UE 115 is in a connected state a base station 105 may use a preconfigured dedicated manner to determine random access parameters for the UE 115 to generate a random access preamble.

In some examples, a base station 105 may transmit different RACH configurations (e.g., through system information, such as SIB-1) for different UE 115 types (e.g., aerial UEs 115 versus terrestrial UEs 115). The RACH configurations may include, for example, different sets of parameters for the different types of UEs 115. For example, a first set of parameters (e.g., cyclic shifts, frequency resources, time resources, or root sequences for random access preambles) may be for terrestrial UEs, and a second set of parameters (e.g., cyclic shifts, frequency resources, time resources, or root sequences for random access preambles) may be for aerial UEs.

Techniques described herein provide for flexible timing of random access transmissions to compensate for greater propagation delays for aerial UEs 115. In some examples, an aerial UE 115 may determine the distance between a base station and the aerial UE 115 based on a received position of the base station and the position of the aerial UE 115. The aerial UE 115 may determine a timing delay (e.g., a precompensation timing) based on the determined distance between the two devices, and may transmit preambles according to the timing delay. In some examples, the aerial UE 115 may transmit an indication of the timing delay to the base station 105 (e.g., as part of a first random access message (message A) in a two-step random access procedure or a third random access message (message 3) in a four-step random access procedure). The base station 105 may apply this to an estimated propagation delay for the UE 115 that the base station 105 may calculate based on reception of uplink signaling, to more accurately indicate a timing advance (TA) for subsequent signaling.

Figure 2:
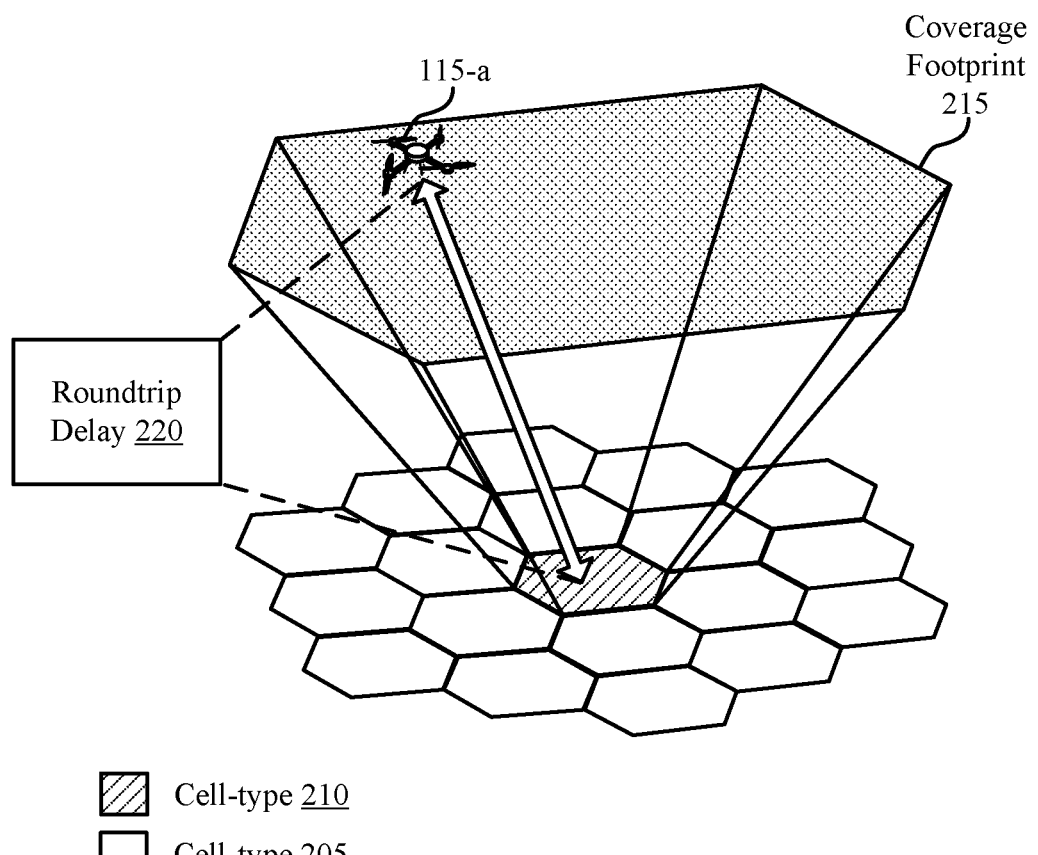
FIG. 2 illustrates an example of a wireless communications system that supports flexible random access channel configurations in accordance with aspects of the present disclosure.

FIG. 2 illustrates an example of a wireless communications system 200 that supports flexible random access channel configurations in accordance with aspects of the present disclosure. In some examples, the wireless communications system 200 may implement aspects of the wireless communications system 100. The wireless communications system 200 may include a UE 115-a, which may be examples of a UE 115, as described herein with reference to FIG. 1. The UE 115-a may communicate with one or more other wireless devices (e.g., other UEs 115 or base stations 105) across various cells (e.g., different cell-types, such as a cell-type 205 and a cell-type 210). In some examples, cells may be configured such that there are three cell-types 210 for every fifty-seven cell-types 205.

In some examples, a cell-type 205 may represent a terrestrial cell (e.g., a legacy cell) and a cell-type 210 may represent an aerial cell (e.g., cells with uptilted beams for communication with aerial UEs 115). For example, the cell-type 205 may support communications with terrestrial UEs, such that a base station 105 in the cell-type 205 may use downtilted beams (e.g., a beam pointing toward the ground). Additionally, the cell-type 210 may support communications with terrestrial UEs and aerial UEs, such that a base station 105 in the cell-type 210 may use both downtilted beams and uptilted beams (e.g., a beam pointing toward the sky).

In some cases, a cell-type 205 and a cell-type 210 may have different coverage footprints. For example, terrestrial coverage footprints and aerial coverage footprints of a cell may be very different. Because a downtilted beam may be interrupted by an obstruction (e.g., the ground) at a lesser distance than an uptilted beam, an uptilted beam may travel a greater distance than a downtilted beam. Thus, a cell may cover a larger volume in the air than on the ground. As the cell-type 210 may also support communications with aerial UEs, a coverage footprint for the cell-type 210 (e.g., a coverage footprint 215) may be larger than a coverage footprint for the cell-type 205. A base station in the cell-type 210 may support communications with terrestrial UEs 115 in a small coverage footprint, while simultaneously supporting communications with aerial UEs 115-a located within the coverage footprint 215.

In some examples, communications transmitted between a UE 115-a and a base station 105 in a cell-type 210 may take an amount of time (e.g., a roundtrip delay 220). For example, if the base station 105 in the cell-type 210 transmits a first message to the UE 115-a, the UE 115-a may receive the first message a first amount of time after the transmission initiates. The UE 115-a may then transmit a second message to the base station 105, where the base station 105 may receive the second message a second amount of time after the UE 115-a initiates the transmission. Roundtrip delay 220 may be a combination of the first amount of time and the second amount of time (e.g., and may include or otherwise be affected by processing time at the receiving device). While the roundtrip delay 220 is explained with reference to a first transmission from the base station 105 and a second transmission from the UE 115-a, the first transmission and the second transmission may not represent all possible transmissions to calculate a roundtrip delay 220.

In some examples, a UE 115-*a* may perform random access procedures with a base station (e.g., in a cell-type 210). The UE 115-*a* may perform two-step random access procedures or four-step random access procedures (e.g., to establish a connection with the base station of a particular cell, re-establish a connection, as part of a handover procedure, as part of a beam alignment or beam sweeping procedure, or the like). In such examples, the UE 115-*a* may generate a random access preamble for transmission to the base station. The UE 115-*a* may generate the random access preamble according to one or more random access parameters. For example, as described herein, the random access preamble may be based on a cyclic shift. The cyclic shift may be utilized to ensure that the random access preamble is orthogonal to other random access preambles transmitted by other UEs 115. The UE 115-*a* may use a cyclic shift that is one of a supported set of cyclic shifts.

In some cases, wireless devices in different locations may experience different round trip delays. Different roundtrip delays 220 for devices (e.g., UEs 115) located at different places may result in an amount of uncertainty (e.g., a timing uncertainty resulting from propagation delays). Timing uncertainty may be based on a worst case scenario (e.g., a worst case propagation delay caused by UEs 115 located on the cell-edge). Thus, supported cyclic shifts may be defined to be different by at least a threshold amount (e.g., to compensate for the timing uncertainty resulting from the UEs 115 being located in different places). If different cyclic shifts are different by an amount smaller than a threshold (e.g., an amount of time equal to a time uncertainty, a delay spread, and a guard interval, or any combination thereof), then random access preamble sequences may not be uniquely determined by the receiving base station 105, resulting in failed random access procedures, system delays or the like.

In some examples, if different types of UEs 115 (e.g., terrestrial UEs and aerial UEs) generate random access preambles using the same set of supported cyclic shifts, random access procedures may fail or communication quality may degrade. For example, the UE 115-*a* (e.g., an aerial UE) may be located significantly farther away from a base station 105 (e.g., as described in greater detail with reference to a base station 105-*a* as depicted in FIG. 2) than a terrestrial UE (e.g., served by the base station 105) located at the edge of a cell-type 210. Thus, if the UE 115-*a* generates a preamble using cyclic shifts supported by a terrestrial UE 115, the preamble, as received by the base station 105, may not be uniquely determinable relative to other preambles received from other UEs attempting random access procedures. Such failures to uniquely determine received preambles at the base station 105 may occur as a result of large propagation delays that result in cyclic shift estimation error more than the value of $N_{CS}$. This may result in collisions, random access failure, increased delays, or the like. Additionally, or alternatively, if a single set of cyclic shifts are supported for both the terrestrial UE 115-*a* (e.g., in a relatively small geographic coverage area) and the UE 115-*a* (in a relatively larger geographic coverage area), then the number of cyclic shifts in the set of supported cyclic shifts may be limited because the large potential separation distance of the UE 115-*a* may correspond to a large threshold difference between supported cyclic shifts. Such scenarios may result in failed random access procedures, increased interference, increased system latency, and reduced user experience.

To avoid such issues, random access preamble configurations may include flexible configurations for different types of UEs, where a first set of configuration parameters may be for terrestrial UEs, and a second set of configuration parameters may be for aerial UEs, as described in more detail with reference to FIGS. 3-4. In some examples, a UE 115-*a* may determine a timing delay (e.g., a pre-compensation timing delay) based on the roundtrip delay 220 resulting from the distance between the UE 115-*a* and the base station 105. In such examples, the UE 115-*a* may transmit a random access preamble according to the timing delay to compensate for the roundtrip delay 220 experienced by the UE 115-*a* in a coverage footprint 215, as described in greater detail with reference to FIGS. 5-7.

Figure 3:
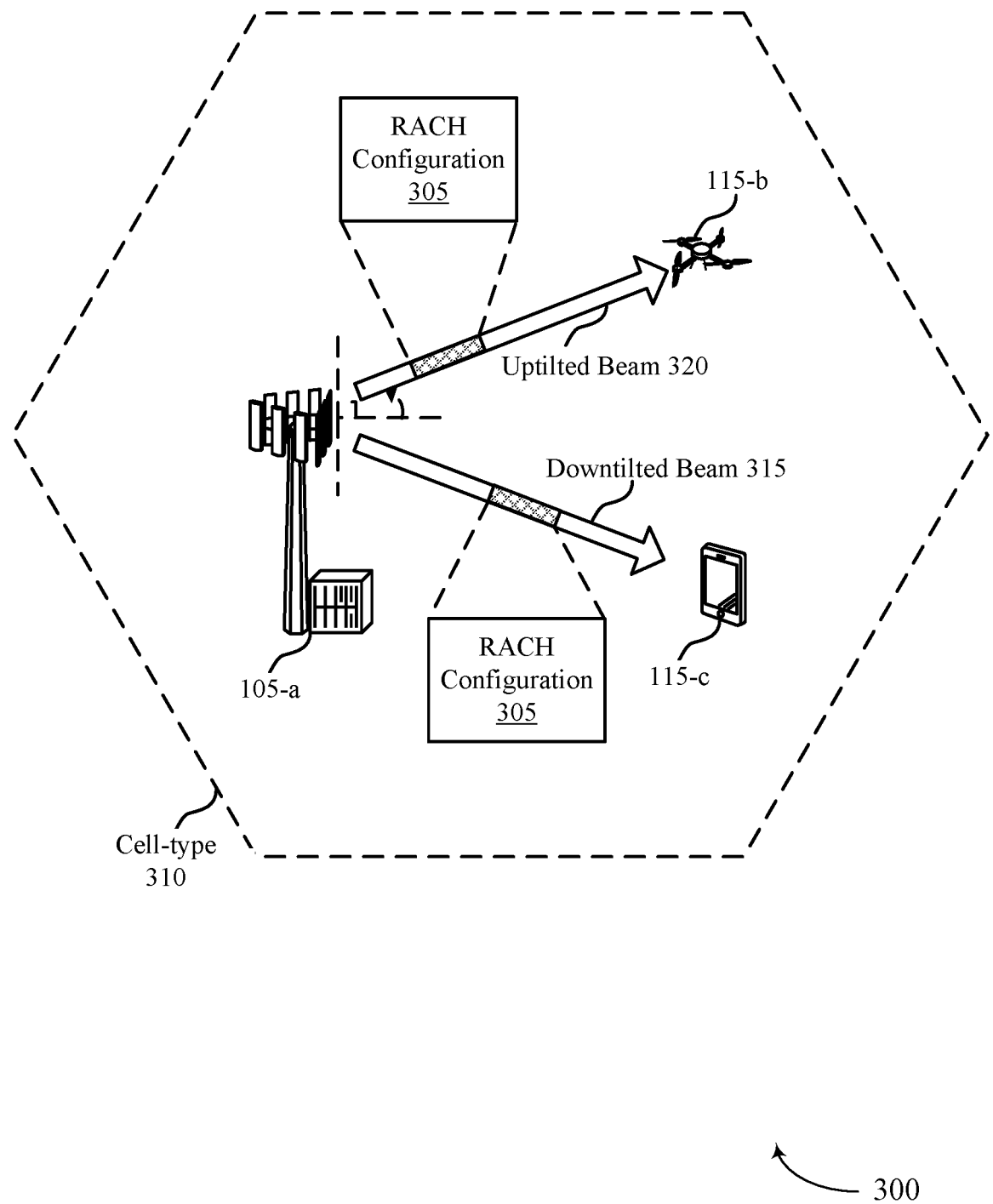
FIG. 3 illustrates an example of a wireless communications system that supports flexible random access channel configurations in accordance with aspects of the present disclosure.

FIG. 3 illustrates an example of a wireless communications system 300 that supports flexible random access channel configurations in accordance with aspects of the present disclosure. In some examples, the wireless communications system 300 may implement aspects of the wireless communications system 100 or the wireless communications system 200 or both. The wireless communications system 300 may include a UE 115-*b*, a UE 115-*c*, and a base station 105-*a*, which may be examples of UEs 115 or base stations 105, as described herein with reference to FIGS. 1 and 2. The wireless communications system 300 may support wireless communications between the base station 105-*a* within a geographic coverage area (e.g., a cell-type 310, which may be an example of an aerial cell such as a cell-type 210, as described herein with reference to FIG. 2.

In some examples, a base station 105-*a* may communicate with a UE 115-*b*, a UE 115-*c*, or both. In some cases, the UE 115-*b* may represent an aerial UE and the UE 115-*c* may represent a terrestrial UE. For example, the UE 115-*b* may operate using an aerial subscription, may operate using an aerial subscription and be located higher than a threshold, may operate using an aerial subscription and random access resources that are associated with an uptilted beam 320 (e.g., the uptilted beam 320 may be associated with an SSB index corresponding to aerial UEs) or may use random access resources that are associated with an uptilted beam 320 (e.g., the uptilted beam 320 may be associated with an SSB index corresponding to aerial UEs) regardless of whether the UE 115-*b* uses an aerial subscription. The UE 115-*c* may operate without an aerial subscription, may have an aerial subscription but may be located below the threshold height, may communicate with the bae station 105-*b* using a beam that is not uptilted (e.g., a downtilted beam 315), or may be any other type of UE that is not an aerial UE. A base station 105-*a* may use an uptilted beam 320 to convey system information to a UE 115-*b* and a downtilted beam 315 to convey system information to a UE 115-*c*.

In some examples, a base station 105-*a* may transmit a system information to a UE 115-*b*, a UE 115-*c*, or both. The base station 105-*a* may broadcast the system information. The system information may include a RACH configuration 305, which the base station 105-*a* may transmit to the UE 115-*b* using an uptilted beam 320 and to the UE 115-*c* using a downtilted beam 315. The RACH configuration 305 may include, for example, a first set of parameters (e.g., cyclic shifts, frequency resources, time resources, or root sequences for random access preambles), a second set of parameters (e.g., cyclic shifts, frequency resources, time resources, or root sequences for random access preambles), or both. In some examples, the first set of parameters and the second set of parameters may be UE-type specific. For example, the first set of parameters may be specific to terrestrial UEs 115-*c* and the second set of parameters may be specific to aerial UEs 115-*b*. By configuring different types of UEs with different sets of parameters, the base station 105-*a* may be able to support a first set of preambles generated by aerial UEs 115-*b* and a second set of preambles generated by terrestrial UEs 115-*c*. By providing different sets of parameters to the different types of UEs 115, the base station may increase the likelihood of a robust number of supported preambles that are orthogonal to each other, resulting in more reliable communications, successful random access procedures, decreased system latency, and improved user experience.

In some examples, the different parameters that are UE-type specific may include cyclic shifts. For instance, the first set of parameters may include a first set of one or more supported cyclic shifts and the second set of parameters may include a second set of one or more supported cyclic shifts different from the first set of cyclic shifts. The first set of cyclic shifts may be for terrestrial UEs (e.g., a UE 115-*c*) and the second set of cyclic shifts may be for aerial UEs (e.g., a UE 115-*b*). For example, the second set of cyclic shifts may be further separated from one another (e.g., may differ from one another by a greater minimum amount) than the first set of cyclic shifts, which may allow the second set of cyclic shifts to support use by a UE 115 that is further from the base station 105-*a*, such as an aerial UE 115-*b*. In some examples (e.g., during a four-step random access procedure), the first set of parameters may include an information element (e.g., zeroCorrelationZoneConfig) for terrestrial UEs 115-*c*, and the second set of parameters may include a second information element (e.g., zeroCorrelationZoneConfig-Aerial) for aerial UEs 115-*b*. Both the first and second sets of parameters may be included in a system information (e.g., RACH-ConfigGeneric), where a base station 105-*a* may transmit RACH-ConfigGeneric as part of a SIB (e.g., a SIB-1). In some examples (e.g., during a two-step random access procedure), the first set of parameters may include a first information element (e.g., msgA-zeroCorrelationZoneConfig) for terrestrial UEs 115-*c*, and the second set of parameters may include a second information element (e.g., msgA-zeroCorrelationZoneConfig-Aerial) for aerial UEs 115-*b*. Both the first and the second sets of parameters may be included in a system information (e.g., in RACH-ConfigGenericTwoStepRA), where a base station 105-*a* may transmit RACH-ConfigGenericTwoStepRA as part of a SIB (e.g., SIB-1).

In some examples, a base station 105-*a* may indicate separate random access resources (e.g., separate time-frequency resources) for different types of UEs (e.g., terrestrial UEs 115-*c* and aerial UEs 115-*b*) according to frequency division multiplexing (FDM), or time division multiplexing (TDM). In some cases, for TDM, FDM or both, the base station 105-*a* may indicate separate RACH transmission occasions for terrestrial UEs and aerial UEs over time. The base station 105-*a* may indicate (e.g., in the system information) a first set of PRACH configuration indices for terrestrial UEs (e.g., a UE 115-*c*) and a second set of separate PRACH configuration indices for aerial UEs (e.g., a UE 115-*b*). In some examples (e.g., during a four-step random access procedure), the first set of parameters may include an information element (e.g., prach-ConfigurationIndex) for terrestrial UEs 115-*c*, and the second set of parameters may include a second information element (e.g., prach-ConfigurationIndex-Aerial) for aerial UEs 115-*b*. Both the first and second sets of parameters may be included in a system information (e.g., RACH-ConfigGeneric), where a base station 105-*a* may transmit RACH-ConfigGeneric as part of a SIB (e.g., SIB-1). In some examples (e.g., during a two-step random access procedure), the first set of parameters may include an information element (e.g., prach-ConfigurationIndex) for terrestrial UEs 115-*c*, and the second set of parameters may include an information element (e.g., prach-ConfigurationIndex-Aerial) for aerial UEs 115-*b*. Both the first and second sets of parameters may be included in a system information (e.g., RACH-ConfigGenericTwoStepRA), where a base station 105-*a* may transmit RACH-ConfigGenericTwoStepRA as part of a SIB (e.g., SIB-1). A receiving UE 115 (e.g., a UE 115-*b* or a UE 115-*c*) may use the PRACH configuration index to determine subframe number and symbol indices in a slot for PRACH transmission.

In some cases, for CDM, a base station 105-*a* may indicate separate aerial specific PRACH Root Sequence Index. For example, the base station 105-*a* may indicate a first set of PRACH root sequence indices for terrestrial UEs (e.g., a UE 115-*c*) and a second set of separate PRACH root sequence indices for aerial UEs (e.g., a UE 115-*b*). In some examples, the first set of parameters may include an information element (e.g., prach-RootSequenceIndex) for terrestrial UEs 115-*c*, and the second set of parameters may include an information element (e.g., prach-RootSequenceIndex-Aerial) for aerial UEs 115-*b*. Both the first and second sets of parameters may be included in a system information (e.g., RACH-ConfigCommon), where a base station 105-*a* may transmit RACH-ConfigCommon as part of a SIB (e.g., SIB-1).

Thus, as described with reference to FIG. 3, a terrestrial UE 115-*c* may generate a first random access preamble according to a first set of random access preamble parameters (e.g., as indicated in a RACH configuration 305). The first random access preamble generated by the terrestrial UE 115-*c* may be based on a first cyclic shift, a first indication of frequency resources, a first indication of time resources, or a first root sequence, or any combination thereof. An aerial UE 115-*b* may generate a second random access preamble according to a second set of random access preambles (e.g., as indicated in a RACH configuration 305). The second random access preamble generated by the aerial UE 115-*b* may be based on a second cyclic shift, a second indication of frequency resources, a second indication of time resources, or a second root sequence, or any combination thereof. Thus, the first random access preamble and the second random access preamble may be orthogonal, based on different cyclic shifts, may be frequency division multiplexed (e.g., based on the different indications of frequency resources), time division multiplexed (e.g., based on the different indications of time resources), or code division multiplexed (e.g., based on the different root sequences). This may result in a higher likelihood of successful random access procedures, improved reliability of system communications, decreased system latency, or the like. In some examples, the base station 105-*a* may indicate (e.g., in the RACH configuration 305) which of the different parameters of the two sets of parameters should be used by the UEs 115 to increase the likelihood of orthogonality between random access preambles.

Figure 4:
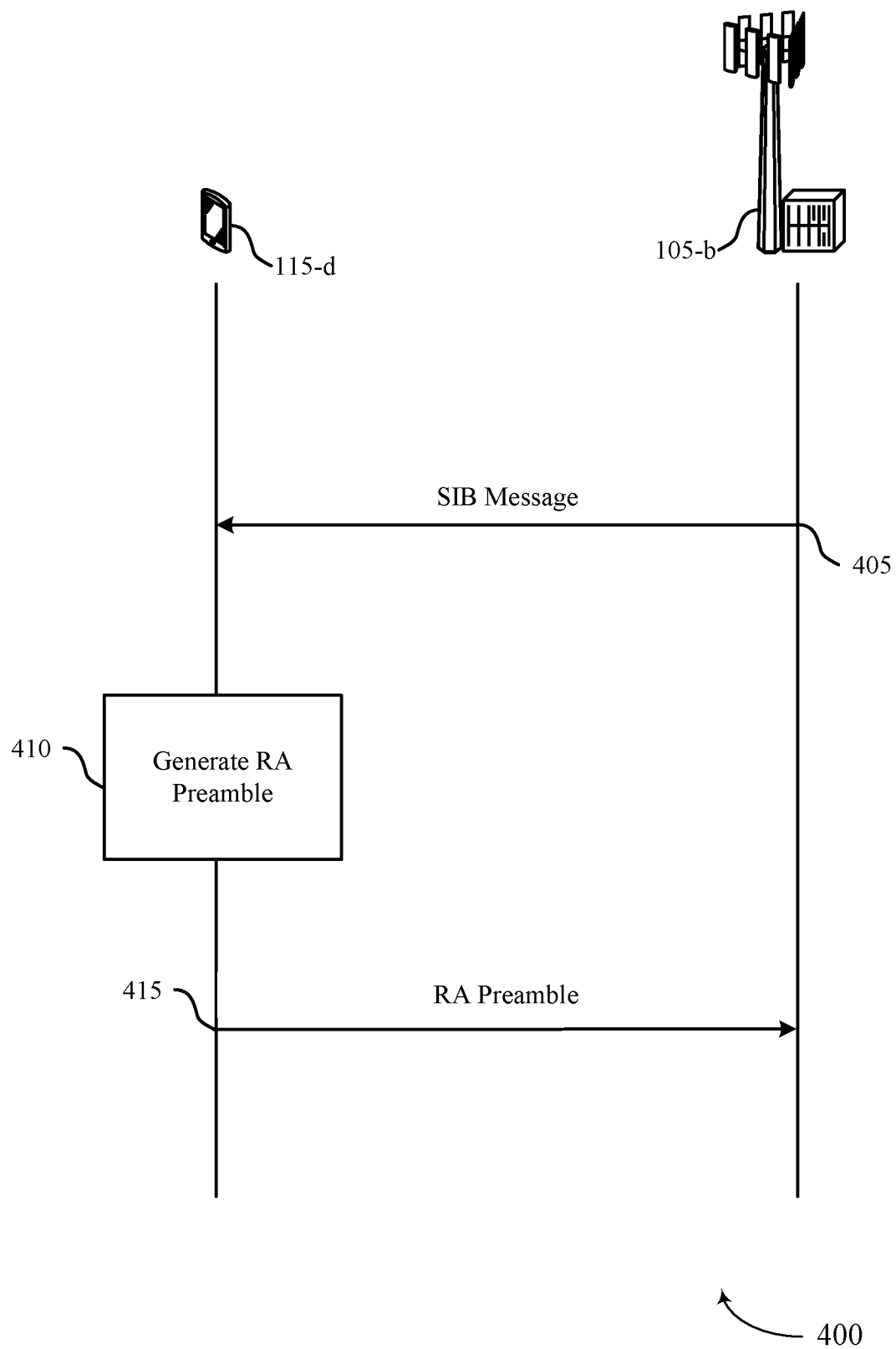
FIG. 4 illustrates an example of a process flow that supports flexible random access channel configurations in accordance with aspects of the present disclosure.

FIG. 4 illustrates an example of a process flow 400 that supports flexible random access channel configurations in accordance with aspects of the present disclosure. In some examples, the wireless communications system 300 may implement aspects of the wireless communications system 100 or the wireless communications system 200 or both. The wireless communications system 300 may include a UE 115-*b*, a UE 115-*c*, and a base station 105-*a*, which may be examples of UEs 115 or base stations 105, as described herein with reference to FIGS. 1 and 2. The wireless communications system 300 may support wireless communications between the base station 105-*a* within a geographic coverage area (e.g., a cell-type 310, which may be an example of an aerial cell such as a cell-type 210, as described herein with reference to FIG. 2.

In some examples, a base station 105-*a* may communicate with a UE 115-*b*, a UE 115-*c*, or both. In some cases, the UE 115-*b* may represent an aerial UE and the UE 115-*c* may represent a terrestrial UE. For example, the UE 115-*b* may operate using an aerial subscription, may operate using an aerial subscription and be located higher than a threshold, may operate using an aerial subscription and random access resources that are associated with an uptilted beam 320 (e.g., the uptilted beam 320 may be associated with an SSB index corresponding to aerial UEs) or may use random access resources that are associated with an uptilted beam 320 (e.g., the uptilted beam 320 may be associated with an SSB index corresponding to aerial UEs) regardless of whether the UE 115-*b* uses an aerial subscription. The UE 115-*c* may operate without an aerial subscription, may have an aerial subscription but may be located below the threshold height, may communicate with the bae station 105-*b* using a beam that is not uptilted (e.g., a downtilted beam 315), or may be any other type of UE that is not an aerial UE. A base station 105-*a* may use an uptilted beam 320 to convey system information to a UE 115-*b* and a downtilted beam 315 to convey system information to a UE 115-*c*.

In some examples, a base station 105-*a* may transmit a system information to a UE 115-*b*, a UE 115-*c*, or both. The base station 105-*a* may broadcast the system information. The system information may include a RACH configuration 305, which the base station 105-*a* may transmit to the UE 115-*b* using an uptilted beam 320 and to the UE 115-*c* using a downtilted beam 315. The RACH configuration 305 may include, for example, a first set of parameters (e.g., cyclic shifts, frequency resources, time resources, or root sequences for random access preambles), a second set of parameters (e.g., cyclic shifts, frequency resources, time resources, or root sequences for random access preambles), or both. In some examples, the first set of parameters and the second set of parameters may be UE-type specific. For example, the first set of parameters may be specific to terrestrial UEs 115-*c* and the second set of parameters may be specific to aerial UEs 115-*b*. By configuring different types of UEs with different sets of parameters, the base station 105-*a* may be able to support a first set of preambles generated by aerial UEs 115-*b* and a second set of preambles generated by terrestrial UEs 115-*c*. By providing different sets of parameters to the different types of UEs 115, the base station may increase the likelihood of a robust number of supported preambles that are orthogonal to each other, resulting in more reliable communications, successful random access procedures, decreased system latency, and improved user experience.

In some examples, the different parameters that are UE-type specific may include cyclic shifts. For instance, the first set of parameters may include a first set of one or more supported cyclic shifts and the second set of parameters may include a second set of one or more supported cyclic shifts different from the first set of cyclic shifts. The first set of cyclic shifts may be for terrestrial UEs (e.g., a UE 115-*c*) and the second set of cyclic shifts may be for aerial UEs (e.g., a UE 115-*b*). In some examples (e.g., during a four-step random access procedure), the first set of parameters may include an information element (e.g., zeroCorrelationZoneConfig) for terrestrial UEs 115-*c*, and the second set of parameters may include a second information element (e.g., zeroCorrelationZoneConfig-Aerial) for aerial UEs 115-*b*. Both the first and second sets of parameters may be included in a system information (e.g., RACH-ConfigGeneric), where a base station 105-*a* may transmit RACH-ConfigGeneric as part of a SIB (e.g., a SIB-1). In some examples (e.g., during a two-step random access procedure), the first set of parameters may include a first information element (e.g., msgA-zeroCorrelationZoneConfig) for terrestrial UEs 115-*c*, and the second set of parameters may include a second information element (e.g., msgA-zeroCorrelationZoneConfig-Aerial) for aerial UEs 115-*b*. Both the first and the second sets of parameters may be included in a system information (e.g., in RACH-ConfigGenericTwoStepRA), where a base station 105-*a* may transmit RACH-ConfigGenericTwoStepRA as part of a SIB (e.g., SIB-1).

In some examples, a base station 105-*a* may indicate separate random access resources (e.g., separate time-frequency resources) for different types of UEs (e.g., terrestrial UEs 115-*c* and aerial UEs 115-*b*) according to frequency division multiplexing (FDM), or time division multiplexing (TDM). In some cases, for TDM, FDM or both, the base station 105-*a* may indicate separate RACH transmission occasions for terrestrial UEs and aerial UEs over time. The base station 105-*a* may indicate (e.g., in the system information) a first set of PRACH configuration indices for terrestrial UEs (e.g., a UE 115-*c*) and a second set of separate PRACH configuration indices for aerial UEs (e.g., a UE 115-*b*). In some examples (e.g., during a four-step random access procedure), the first set of parameters may include an information element (e.g., prach-ConfigurationIndex) for terrestrial UEs 115-*c*, and the second set of parameters may include a second information element (e.g., prach-ConfigurationIndex-Aerial) for aerial UEs 115-*b*. Both the first and second sets of parameters may be included in a system information (e.g., RACH-ConfigGeneric), where a base station 105-*a* may transmit RACH-ConfigGeneric as part of a SIB (e.g., SIB-1). In some examples (e.g., during a two-step random access procedure), the first set of parameters may include an information element (e.g., prach-ConfigurationIndex) for terrestrial UEs 115-*c*, and the second set of parameters may include an information element (e.g., prach-ConfigurationIndex-Aerial) for aerial UEs 115-*b*. Both the first and second sets of parameters may be included in a system information (e.g., RACH-ConfigGenericTwoStepRA), where a base station 105-*a* may transmit RACH-ConfigGenericTwoStepRA as part of a SIB (e.g., SIB-1). A receiving UE 115 (e.g., a UE 115-*b* or a UE 115-*c*) may use the PRACH configuration index to determine subframe number and symbol indices in a slot for PRACH transmission.

In some cases, for CDM, a base station 105-*a* may indicate separate aerial specific PRACH Root Sequence Index. For example, the base station 105-*a* may indicate a first set of PRACH root sequence indices for terrestrial UEs (e.g., a UE 115-*c*) and a second set of separate PRACH root sequence indices for aerial UEs (e.g., a UE 115-*b*). In some examples, the first set of parameters may include an information element (e.g., prach-RootSequenceIndex) for terrestrial UEs 115-*c*, and the second set of parameters may include an information element (e.g., prach-RootSequenceIndex-Aerial) for aerial UEs 115-*b*. Both the first and second sets of parameters may be included in a system information (e.g., RACH-ConfigCommon), where a base station 105-*a* may transmit RACH-ConfigCommon as part of a SIB (e.g., SIB-1).

Thus, as described with reference to FIG. 3, a terrestrial UE 115-*c* may generate a first random access preamble according to a first set of random access preamble parameters (e.g., as indicated in a RACH configuration 305). The first random access preamble generated by the terrestrial UE 115-*c* may be based on a first cyclic shift, a first indication of frequency resources, a first indication of time resources, or a first root sequence, or any combination thereof. An aerial UE 115-*b* may generate a second random access preamble according to a second set of random access preambles (e.g., as indicated in a RACH configuration 305). The second random access preamble generated by the aerial UE 115-*b* may be based on a second cyclic shift, a second indication of frequency resources, a second indication of time resources, or a second root sequence, or any combination thereof. Thus, the first random access preamble and the second random access preamble may be orthogonal, based on different cyclic shifts, may be frequency division multiplexed (e.g., based on the different indications of frequency resources), time division multiplexed (e.g., based on the different indications of time resources), or code division multiplexed (e.g., based on the different root sequences). This may result in a higher likelihood of successful random access procedures, improved reliability of system communications, decreased system latency, or the like. In some examples, the base station 105-*a* may indicate (e.g., in the RACH configuration 305) which of the different parameters of the two sets of parameters should be used by the UEs 115 to increase the likelihood of orthogonality between random access preambles.

Figure 5A:
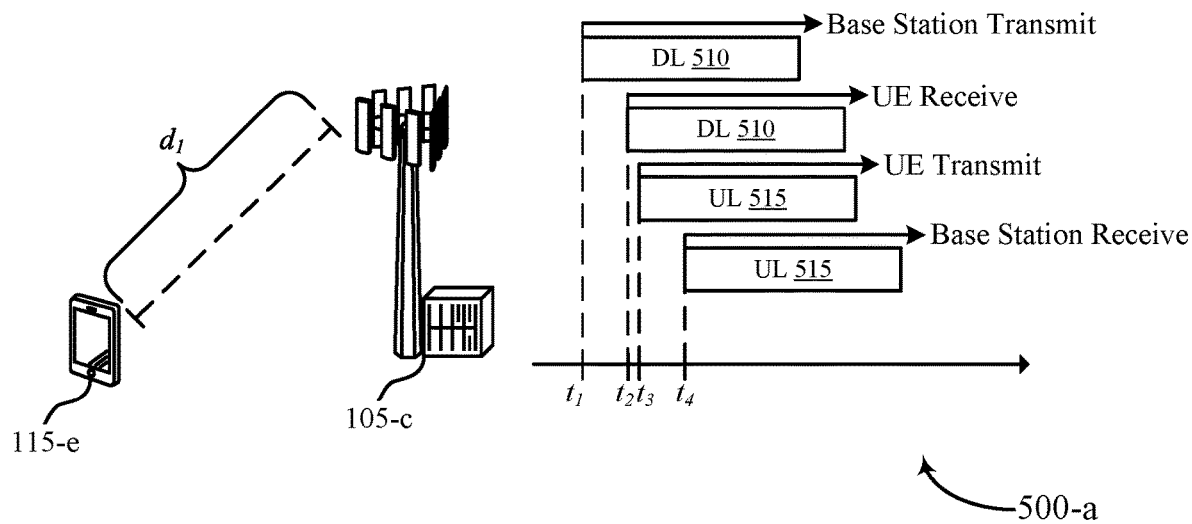
FIGS. 5A-5B illustrate an example of a wireless communications system that supports flexible random access channel configurations in accordance with aspects of the present disclosure.

FIG. 5A illustrates an example of a wireless communications system 500 that supports flexible random access channel configurations in accordance with aspects of the present disclosure. In some examples, the wireless communications system 500-*a* may implement aspects of the wireless communications system 100, the wireless communications system 200, the wireless communications system 300, the process flow 400, or any combination thereof. The wireless communications system 500-*a* may include a UE 115-*e* and a base station 105-*c*, which may be examples of UEs 115 and base stations 105, as described herein with reference to FIGS. 1-4. The UE 115-*e* may be a certain distance (e.g., $d_1$) from a base station 105-*c*. In some cases, the UE 115-*e* may represent a terrestrial UE and may be located within a terrestrial cell, which may be an example of a cell-type 205 with reference to FIG. 2.

In some examples, a base station 105-*c* may perform a random access procedure according to a first timeline (e.g., under an assumption of free space propagation). At time $t_1$, the base station 105-*c* may transmit a message on a downlink 510 (e.g., system information, or the like) to a UE 115-*e*. After a first propagation delay (e.g., $$\frac{d1}{c},$$

where c is the speed of light), at time $t_2$, the UE 115-*e* may receive the downlink 510. At time $t_3$, the UE 115-*e* may transmit a message on an uplink 515 (e.g., a random access message 1 or a random access message A of a random access procedure) and the base station 105-*c* may receive the uplink 515 after the propagation delay (e.g., at $t_4$ after $$\frac{d1}{c}$$

). In some cases, the first timeline may represent a legacy timeline. While the first timeline is depicted in sequential order it is to be understood that other time ordering may be possible.

However, as $d_1$ may represent different distances with different propagation delays for different types of devices, a certain amount of uncertainty (e.g., a timing uncertainty resulting from propagation delays) may be introduced to uplink and downlink signaling. An aerial UE (e.g., a UE 115-*f*) may be located further away than a terrestrial UE that is located at the cell edge of a terrestrial cell. Thus, $d_1$ for an aerial UE 115-*f* may be greater than even a largest possible (e.g., worst case scenario) $d_1$ for a terrestrial UE 115-*e* served by the same base station 105. Thus, if both aerial UEs 115-*f* and terrestrial UEs 115-*e* generate random access preambles using a same set of supported cyclic shifts, then the cyclic shifts may not be different enough from each other to satisfy a threshold. If different cyclic shifts are different by an amount smaller than a threshold (e.g., an amount of time equal to a time uncertainty, a delay spread, and a guard interval, or any combination thereof), then random access preamble sequences may not be orthogonal to each other as estimated by the base station 105-*c*, resulting in failed random access procedures, system delays or the like. Further, if the UE 115-*f* generates a preamble using cyclic shifts supported by terrestrial UEs (e.g., a UE 115-*e*), the generated preamble may not be orthogonal to other preambles, or the delay for such signaling may be greater than expected by the base station 105-*d*. Additionally, or alternatively, if a single set of cyclic shifts are supported for both a UE 115-*e* (e.g., in a relatively small geographic coverage area) and a UE 115-*f* (e.g., in a relatively larger geographic coverage area), then the number of cyclic shifts in the set of cyclic shifts may be limited because the large potential separation distance of the UE 115-*f* may correspond to a large minimum difference between supported cyclic shifts. The relatively larger geographic coverage area may be an example of a coverage footprint 215 with reference to FIG. 2. These scenarios may result in failed random access procedures, increased interference, increased system latency, and reduced user experience.

To avoid such issues, an aerial UE 115-*f* may calculate a timing delay based on the distance between the aerial UE 115-*f* and the base station 105-*d*, and may calculate a transmission timing delay to compensate for the calculated distance, as described in greater detail with reference to FIG. 5B.

Figure 5B:
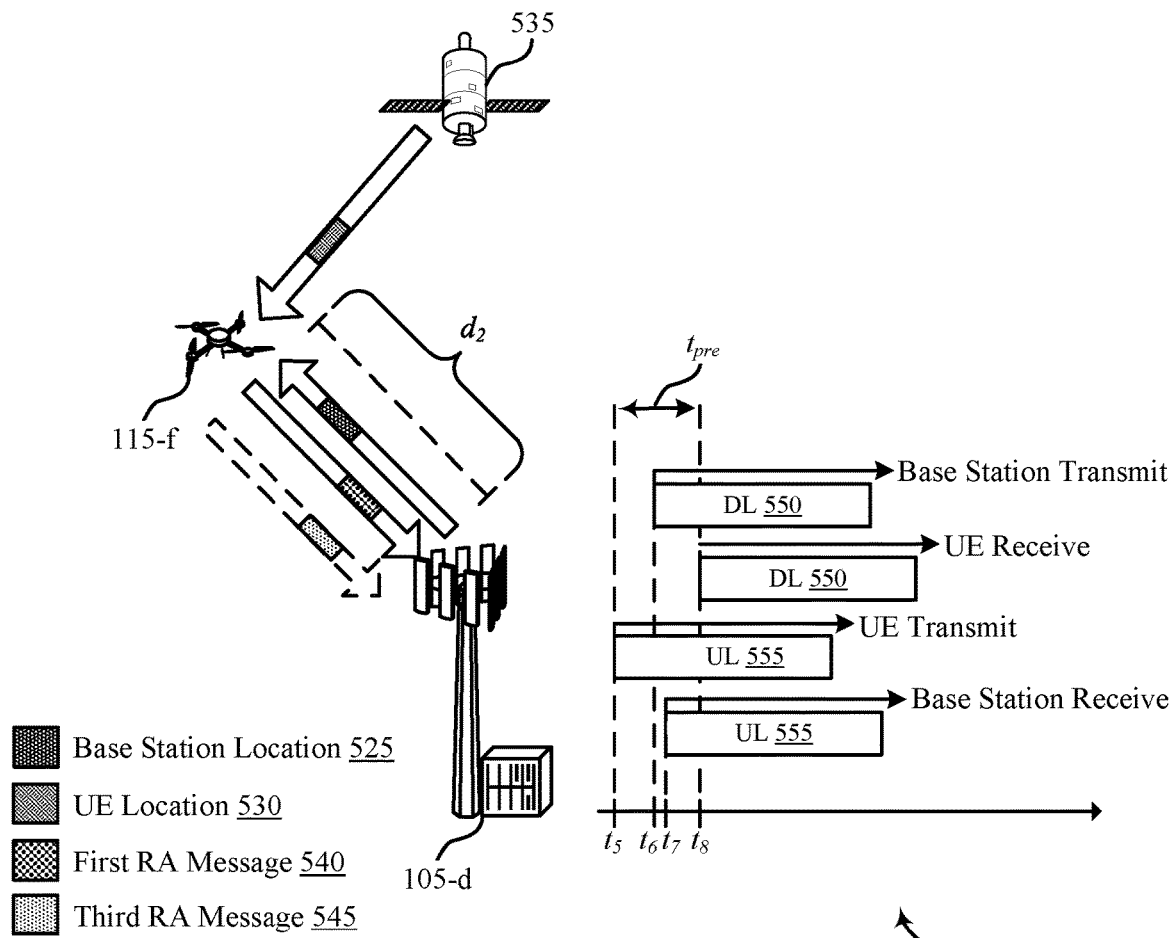

FIG. 5B illustrates an example of a wireless communications system 500 that supports flexible RACH configurations in accordance with aspects of the present disclosure. In some examples, the wireless communications system 500-*b* may implement aspects of the wireless communications system 100, the wireless communications system 200, the wireless communications system 300, the process flow 400, and the wireless communications system 500-*a*. The wireless communications system 500-*b* may include a UE 115-*f* and a base station 105-*d*, which may be examples of UEs 115 and base stations 105, as described herein with reference to FIGS. 1-4. The UE 115-*f* may be a certain distance (e.g., $d_2$) from the base station 105-*d*. In some cases, the UE 115-*f* may represent an aerial UE and may be located within an aerial cell, which may be an example of a cell-type 210 as described with reference to FIG. 2.

In some examples, a UE 115-*f* may be located significantly farther away from a base station 105-*d* than a terrestrial UE 115-*e* (e.g., even if the terrestrial UE 115-*e* is located on a cell-edge $d_1$ away from the base station 105-*c*).

For example, d₂ may be significantly greater than d₁ (e.g., as a result of the relatively larger coverage footprint in which the base station 105-*d* serves aerial UEs 115-*f*, such as a coverage footprint 215 described with reference to FIG. 2.

In some examples, the base station 105-*d* and the UE 115-*f* may perform a random access procedure according to a second timeline, in which the UE 115-*f* may communicate according to a timing delay (e.g., a pre-compensation timing $t_{pre}$). The base station 105-*d* may broadcast its location (e.g., as part of a system information, such as SIB-1 or Positioning SIB) with some uncertainty. The base station may transmit the system information including a base station location 525. The UE 115-*f* may determine its own location (e.g., via global navigation satellite system (GNSS), via a satellite 535, or the like). For instance, the satellite 535 may transmit an indication of the UE location 530 to the UE 115-*f*. The UE 115-*f* may determine d₂ based on the UE location 530 and the base station location 525. The UE 115-*f* may determine a timing delay (e.g., a pre-compensation timing, $t_{pre}$) based on d₂, and may transmit preambles according to the timing delay. For example, the UE 115-*f* may compute $t_{pre}$ according to equation 5:

$$t_{pre} = \frac{\|x - x_{gNB}\|}{c} + \Delta, \quad \text{Equation 5}$$

where x is the location of the UE 115-*f* in vector notation, $x_{gNB}$ is the location of the base station 105-*d* in vector notation, and c is the speed of light. In Equation 5, the term may be the Euclidean norm of a vector, where the vector is equal to $x-x_{gNB}$. The term Δ in Equation 5 may be an adjustment (e.g., overcompensation) factor, which may be an adjustment to $t_{pre}$ configured by the base station 105-*d* (e.g., indicated by the base station 105-*d* as part of system information, such as a SIB-1 system information block). The value of \Delta may, for example, correspond to an amount by which $t_{pre}$ is reduced relative to the value which would otherwise be calculated based on Equation 5, to avoid the UE 115-*f* overcompensating for its distance from the base station 105-*d* (e.g., avoid the UE 115-*f* transmitting a preamble excessively early, according to an undesirably large value of $t_{pre}$).

The UE 115-*f* may transmit preambles according to a timing delay (e.g., $t_{pre}$) based on a calculated distance (e.g., d₂). For example, The UE 115-*f* may receive a downlink signaling according to a propagation delay based on d₂. For instance, at time t₆, the base station 105-*d* may transmit a downlink 550 (e.g., a system information, and the like) to the UE 115-*f*. Because of the propagation delay, the UE 115-*f* may receive the downlink 550 at time t₈. However, to compensate for the propagation delay, at time t₅, the UE 115-*f* may transmit an uplink 555 (e.g., a random access message 1 or a random access message A) at $t_{pre}$ time units earlier than t₃ (e.g., $t_{pre}$ time units earlier than the UE 115-*e* would transmit). After a first propagation delay (e.g., $$\frac{d2}{c},$$

where c is the speed of light), at time t₇, the base station 105-*d* may receive the uplink 555. By transmitting a random access preamble at $t_{pre}$ time units earlier than t₃, the UE 115-*f* may compensate for the greater distance d₂ (and in turn greater propagation delay) in relation to the distance d₁ of the UE 115-*e*.

Thus, the UE 115-*f* may generate a preamble using cyclic shifts supported by terrestrial UEs (e.g., the UE 115-*e*), where the generated preamble may be orthogonal to other preambles, and the delay for such signaling may be expected by the base station 105-*d*. Additionally, or alternatively, a single set of cyclic shifts may support both a UE 115-*e* (e.g., in a relatively small geographic coverage area) and a UE 115-*f* (e.g., in a relatively larger geographic coverage area), because the large potential separation distance (and therefore propagation delay) of the UE 115-*f* may be compensated for based on transmissions according to $t_{pre}$. In some examples, to facilitate accurate timing alignment between the base station 105-*d* and the UE 115-*f*, the UE 115-*f* may transmit an indication of the calculated $t_{pre}$ to the base station 105-*d* (e.g., in a message A of a two-step random access procedure or a message 3 of a four-step random access procedure) as described in greater detail with reference to FIGS. 6 and 7.

In some cases, base station 105-*d* may transmit random access parameters (e.g., a first set of parameters and a second set of parameters), where the random access parameters may be an example of RACH configuration 305 with reference to FIG. 3. In some examples, legacy UEs (e.g., a UE 115-*e*) and aerial UEs (e.g., a UE 115-*f*) with pre-compensation capability may ignore the first set of parameters, the second set of parameters, or both. Aerial UEs without pre-compensation capability may use preamble configurations (e.g., the first set of parameters, the second set of parameters, or both).

Figure 6:
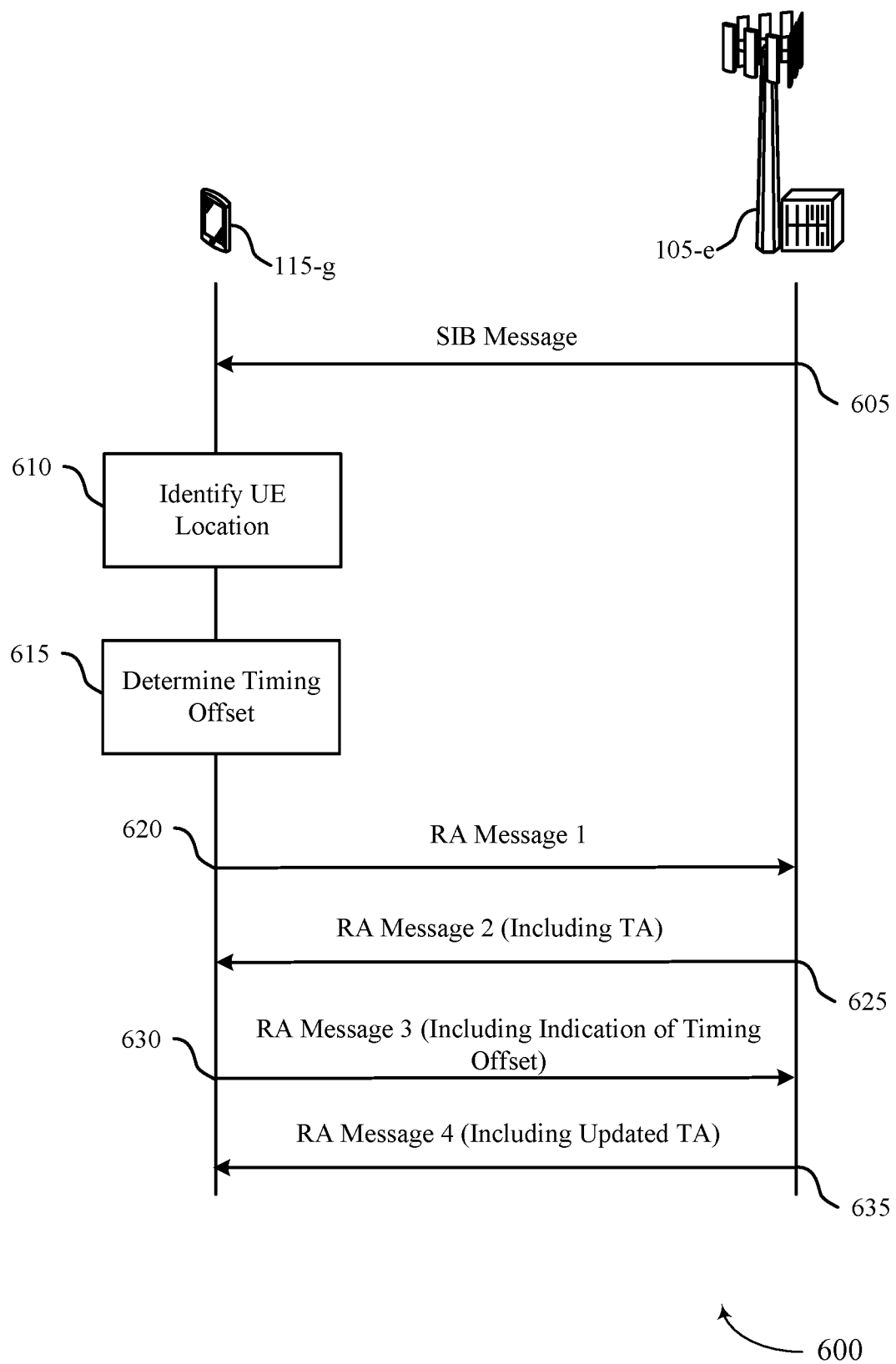
FIG. 6 illustrates an example of a process flow that supports flexible random access channel configurations in accordance with aspects of the present disclosure.

FIG. 6 illustrates an example of a process flow 600 that supports flexible random access channel configurations in accordance with aspects of the present disclosure. The process flow 600 may include a UE 115-*g* and a base station 105-*e*, which may be respective examples of UEs 115 and base stations 105 as described with reference to FIGS. 1-5. The process flow 600 may represent a four-step random access procedure in accordance with aspects of the present disclosure.

At 605, a base station 105-*e* may transmit a system information (e.g., a SIB message, a Position SIB, or any combination thereof) to a UE 115-*g*. The system information may include an indication of a location (e.g., with some degree or level of uncertainty) of the base station 105-*e*.

At 610, the UE 115-*g* may identify its location. For example, the UE 115-*g* may calculate its location using any method or techniques (e.g., via GNSS, by receiving an indication of its location from a satellite, by calculating its coordinates based at least in part on a grid overlaying a geographic coverage area, or the like). The satellite may be an example of a satellite 535 with reference to FIG. 5.

In some cases, the UE 115-*g* may calculate the distance between the base station 105-*e* and the UE 115-*g* based on the location of the base station 105-*e* and the location of the UE 115-*g*.

At 615, the UE 115-*g* may determine a timing delay (e.g., a first timing delay). The first timing delay may be a pre-compensation timing based on the distance between the location of the base station 105-*e* and the UE 115-*g*. The first timing delay may be an example of $t_{pre}$ as described with reference to FIG. 5.

At 620, the UE 115-*g* may transmit a first random access message (e.g., random access message 1) to the base station 105-*e* according to the first timing delay. For example, the UE 115-*g* may transmit the random access message 1, where the random access message 1 may include a random access preamble based on the first timing delay. For instance, the UE 115-*a* may transmit the random access preamble earlier (e.g., by a number of time units equal to the first timing delay) than a legacy UE 115 would transmit the random access preamble. In some cases, the UE 115-g may determine the random access preamble based on the first timing delay.

At 625, the base station 105-e may transmit a second random access message (e.g., a random access message 2) to the UE 115-g. The random access message 2 may include an indication of a TA (e.g., a second timing delay). The second timing delay may be calculated by the base station 105-e based on an estimated propagation delay. The estimated propagation delay may be estimated based on reception of uplink signaling (e.g., a random access message 1 at 620). Because the second timing delay may be calculated assuming a terrestrial UE (e.g., a legacy UE 115 located within the coverage area of a terrestrial cell-type) the second timing delay may be inaccurate for timing synchronization. For example, if the UE 115-g transmits a random access message 1 at $t_{pre}$ time units earlier than a terrestrial UE 115 would transmit the random access message 1, the base station 105-e may estimate the propagation delay incorrectly (e.g., because the base station 105-e may be unaware that the UE 115-g transmitted the random access message 1 according to $t_{pre}$).

At 630, the UE 115-g may transmit a third random access message (e.g., a random access message 3) to the base station 105-e. The random access message 3 may include an indication of the timing delay (e.g., the first timing delay). Thus, the UE 115-g (e.g., an aerial UE) may inform the base station 105-e about the first timing delay (e.g., $t_{pre}$) using the random access message 3.

At 635, the base station 105-e may transmit a fourth random access message (e.g., a random access message 4) to the UE 115-g. The random access message 4 may include an updated TA (e.g., a third timing delay). The updated TA may be a recalculated TA according to the indication of the timing delay sent by the UE 115-g. In other words, if the base station 105-e detects the indication of the first timing delay (e.g., $t_{pre}$) in the random access message 3 at 630, the base station 105-e may apply the first timing delay to a TA calculation from the propagation delay estimated from the reception of the random access preamble (e.g., in a random access message 1 received at 620) to calculate the third timing delay. The third timing delay may provide more accurate synchronization timing for communications (e.g., subsequent communications) between the UE 115-g and the base station 105-e than the second timing delay (because it is based on both measured propagation delay by the base station 105-e and $t_{pre}$).

In some examples, as described in greater detail with reference to FIG. 7, the UE 115-g may indicate the calculated $t_{pre}$ during a two-step random access procedure.

Figure 7:
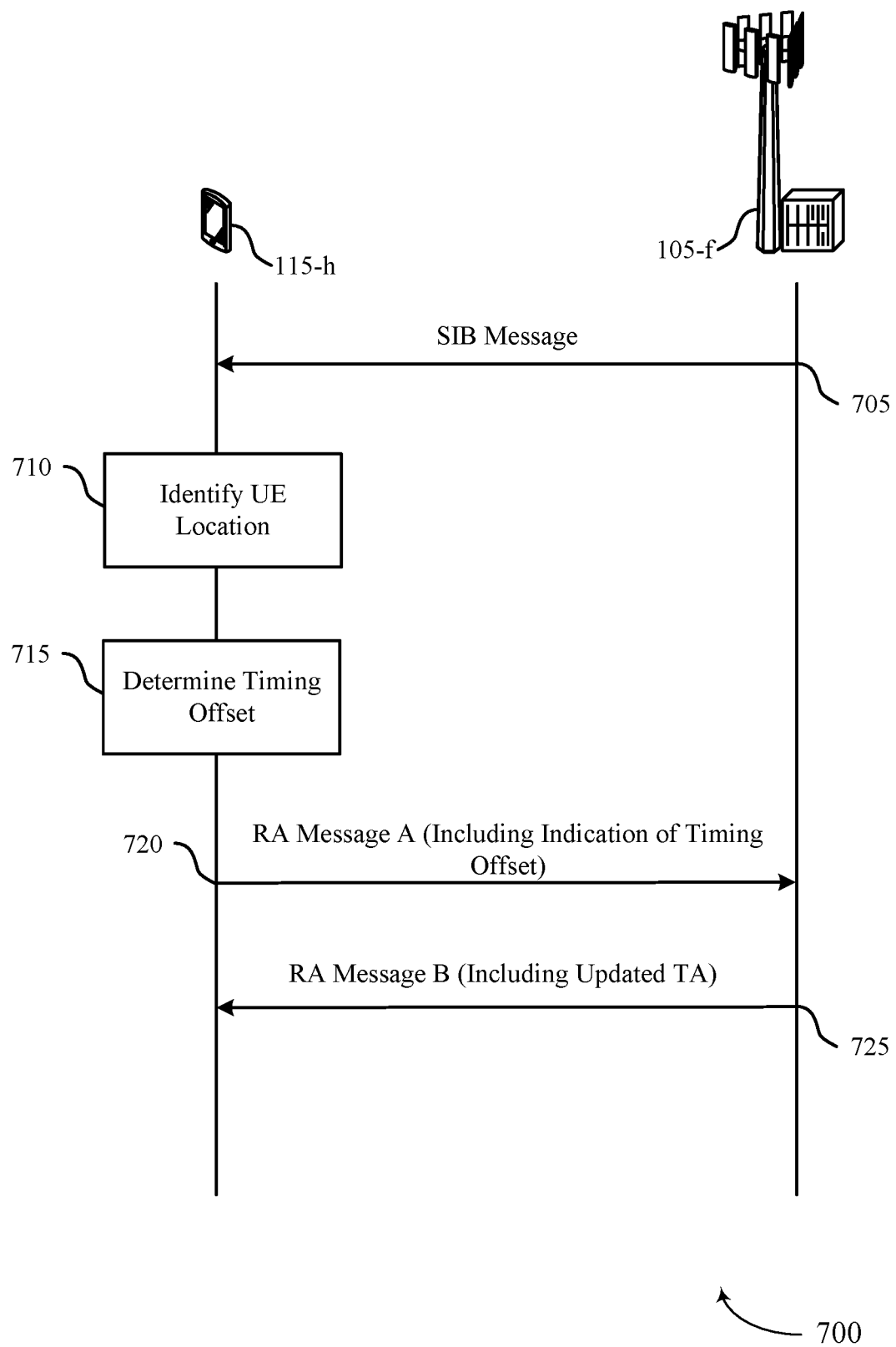
FIG. 7 illustrates an example of a process flow that supports flexible random access channel configurations in accordance with aspects of the present disclosure.

FIG. 7 illustrates an example of a process flow 700 that supports flexible random access channel configurations in accordance with aspects of the present disclosure. The process flow 700 may include a UE 115-h and a base station 105-f, which may be respective examples of UEs 115 and base stations 105 as described with reference to FIGS. 1-6. The process flow 700 may represent a two-step random access procedure in accordance with aspects of the present disclosure.

At 705, a base station 105-f may transmit a system information (e.g., a SIB message, a Position SIB, or any combination thereof) to a UE 115-h. The system information may include an indication of a location (e.g., with some degree or level of uncertainty) of the base station 105-f.

At 710, the UE 115-h may identify its location. For example, the UE 115-h may calculate its location using any method or techniques (e.g., via GNSS, by receiving an indication of its location from a satellite, by calculating its coordinates based at least in part on a grid overlaying a geographic coverage area, or the like). The satellite may be an example of a satellite 535 with reference to FIG. 5.

In some cases, the UE 115-h may calculate the distance between the base station 105-f and the UE 115-h based on the location of the base station 105-e and the location of the UE 115-h.

At 715, the UE 115-h may determine a timing delay (e.g., a first timing delay). The first timing delay may be a pre-compensation timing based on the distance between the location of the base station 105-f and the UE 115-h. The first timing delay may be an example of $t_{pre}$ as described with reference to FIG. 5.

At 720, the UE 115-h may transmit a first random access message (e.g., random access message A) to the base station 105-f according to the first timing delay. The random access message A may include a random access preamble. In some cases, the random access message A may include an indication of the timing delay (e.g., the first timing delay). Thus, the UE 115-h (e.g., an aerial UE) may inform the base station 105-f about the first timing delay (e.g., $t_{pre}$) using the random access message A.

At 725, the base station 105-f may transmit a second random access message (e.g., a random access message B) to the UE 115-h. The random access message B may include a TA (e.g., a second timing delay). The TA may be calculated based on the indication of the timing delay sent by the UE 115-h, an estimated or calculated propagation delay based on receiving the random access message A at 720, or both. In other words, if the base station 105-e detects the indication of the first timing delay, the base station 105-e may apply the first timing delay to a TA calculation from the propagation delay estimated from the reception of the random access preamble to calculate the second timing delay. The second timing delay may provide more accurate synchronization timing for communications (e.g., subsequent communications) between the UE 115-g and the base station 105-e.

Figure 8:
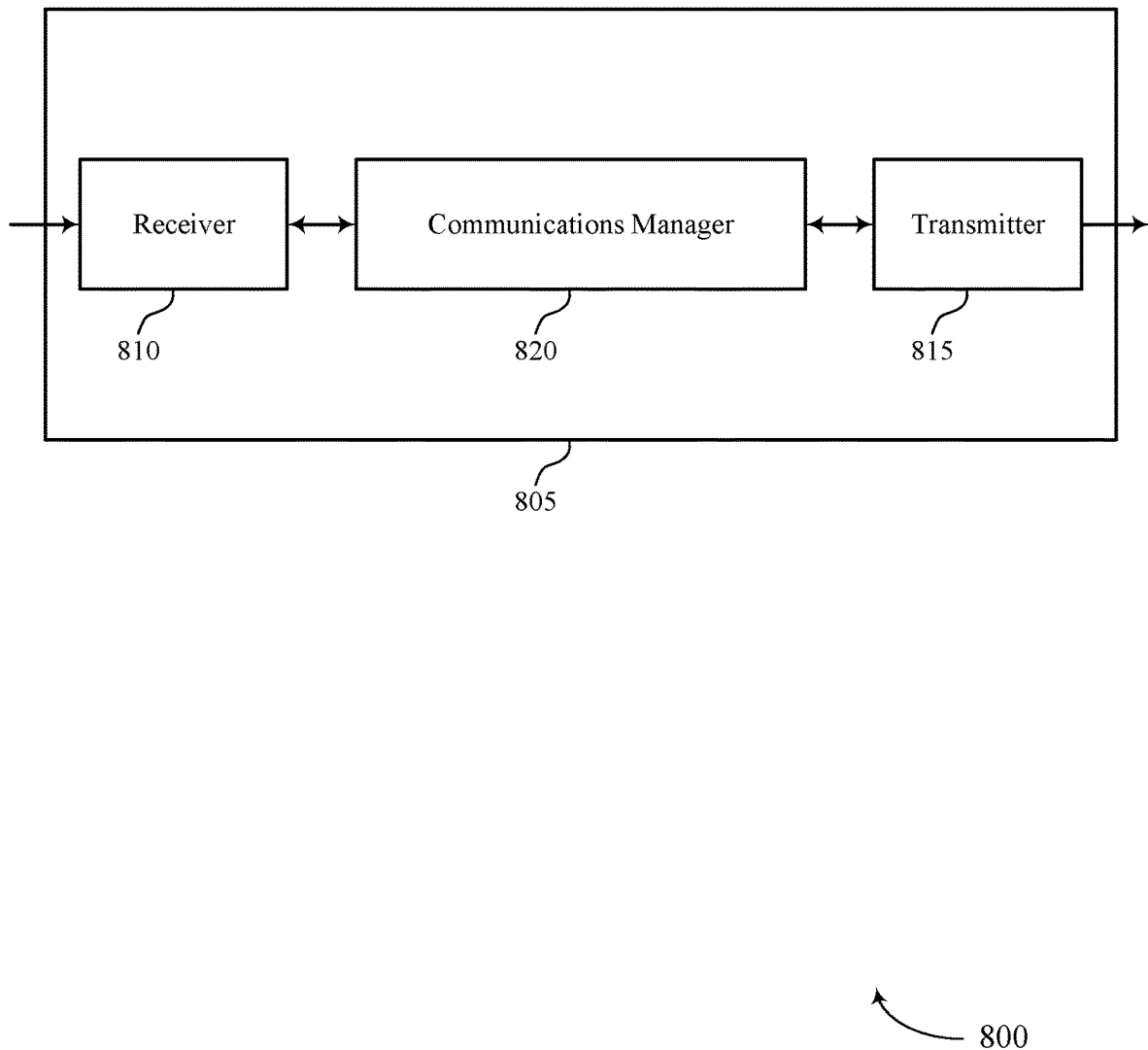
FIGS. 8 and 9 show block diagrams of devices that support flexible random access channel configurations in accordance with aspects of the present disclosure.

FIG. 8 shows a block diagram 800 of a device 805 that supports flexible random access channel configurations in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to flexible random access channel configurations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to flexible random access channel configurations). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of flexible random access channel configurations as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The communications manager 820 may be configured as or otherwise support a means for generating a random access preamble based on the first set of random access preamble parameters or the second set of random access preamble parameters. The communications manager 820 may be configured as or otherwise support a means for transmitting the random access preamble to the base station.

Additionally or alternatively, the communications manager 820 may support wireless communications at a UE in accordance with examples as disclosed herein. For example, the communications manager 820 may be configured as or otherwise support a means for receiving, from a base station, system information including an indication of a location of the base station. The communications manager 820 may be configured as or otherwise support a means for identifying a location of the UE. The communications manager 820 may be configured as or otherwise support a means for transmitting, to the base station, a random access preamble at a time that is based on a distance between the location of the base station and the location of the UE.

By including or configuring the communications manager 820 in accordance with examples as described herein, the device 805 (e.g., a processor controlling or otherwise coupled to the receiver 810, the transmitter 815, the communications manager 820, or any combination thereof) may support techniques for flexible RACH configurations. Described techniques may result in decreased interference and increase the probability of a successful random access procedure. Described techniques may benefit the system by reducing system latency, reducing power consumption, supporting more efficient utilization of communication resources, etc.

Figure 9:
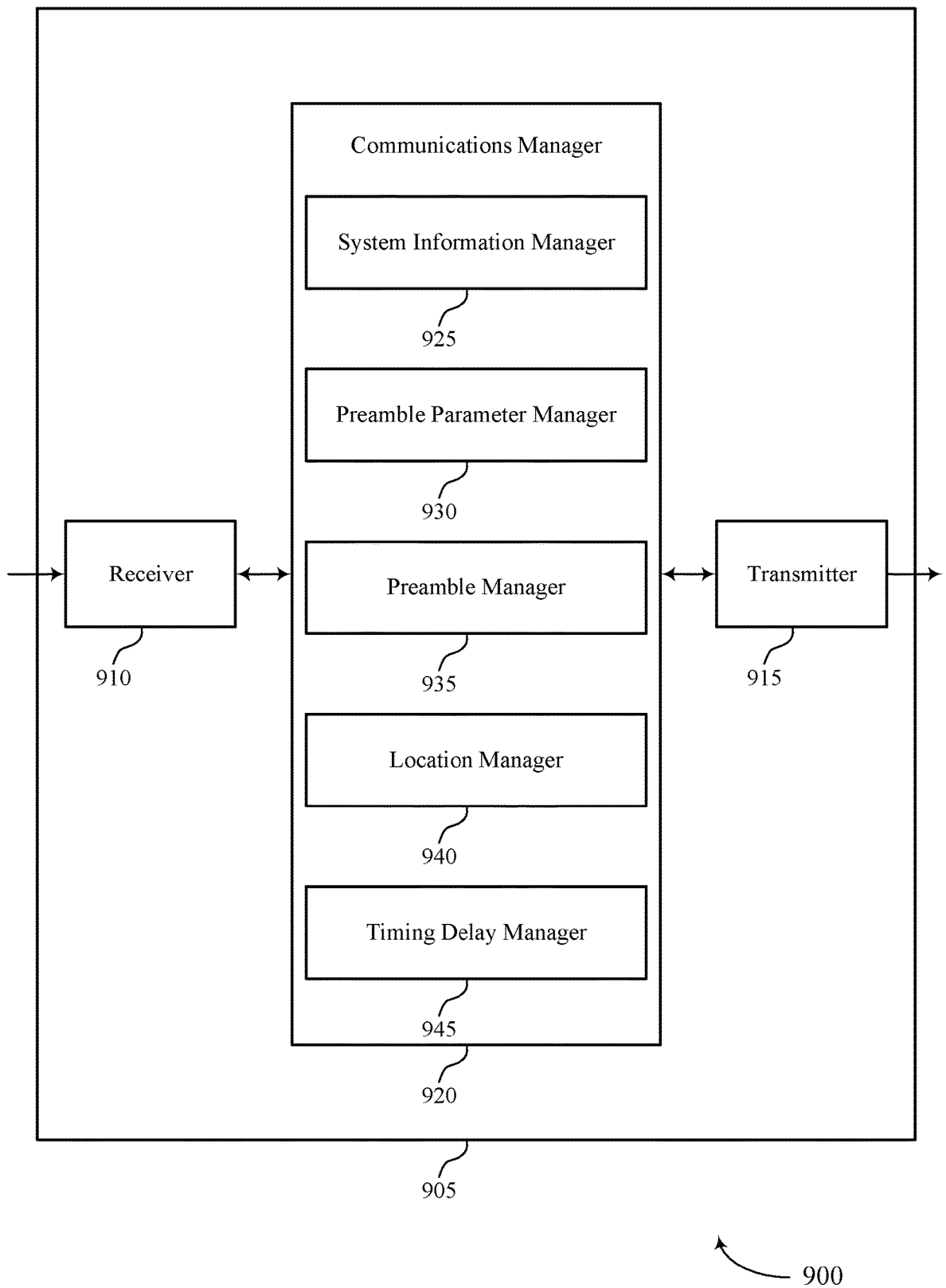

FIG. 9 shows a block diagram 900 of a device 905 that supports flexible random access channel configurations in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to flexible random access channel configurations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to flexible random access channel configurations). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of flexible random access channel configurations as described herein. For example, the communications manager 920 may include a system information manager 925, a preamble parameter manager 930, a preamble manager 935, a location manager 940, a timing delay manager 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The system information manager 925 may be configured as or otherwise support a means for receiving, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The preamble parameter manager 930 may be configured as or otherwise support a means for generating a random access preamble based on the first set of random access preamble parameters or the second set of random access preamble parameters. The preamble manager 935 may be configured as or otherwise support a means for transmitting the random access preamble to the base station.

Additionally or alternatively, the communications manager 920 may support wireless communications at a UE in accordance with examples as disclosed herein. The system information manager 925 may be configured as or otherwise support a means for receiving, from a base station, system information including an indication of a location of the base station. The location manager 940 may be configured as or otherwise support a means for identifying a location of the UE. The timing delay manager 945 may be configured as or otherwise support a means for transmitting, to the base station, a random access preamble at a time that is based on a distance between the location of the base station and the location of the UE.

Figure 10:
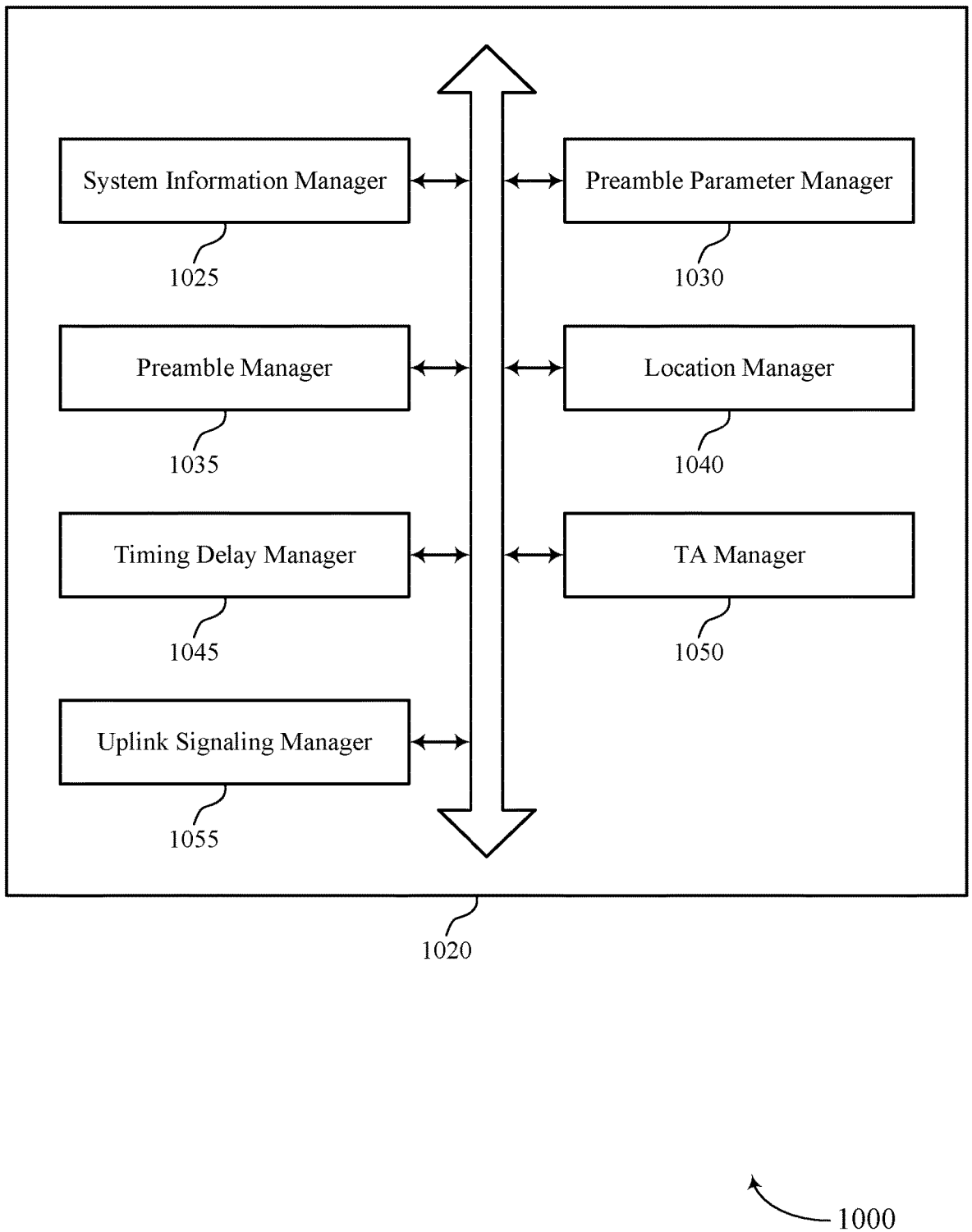
FIG. 10 shows a block diagram of a communications manager that supports flexible random access channel configurations in accordance with aspects of the present disclosure.

FIG. 10 shows a block diagram 1000 of a communications manager 1020 that supports flexible random access channel configurations in accordance with aspects of the present disclosure. The communications manager 1020 may be an example of aspects of a communications manager 820, a communications manager 920, or both, as described herein. The communications manager 1020, or various components thereof, may be an example of means for performing various aspects of flexible random access channel configurations as described herein. For example, the communications manager 1020 may include a system information manager 1025, a preamble parameter manager 1030, a preamble manager 1035, a location manager 1040, a timing delay manager 1045, a TA manager 1050, an uplink signaling manager 1055, or any combination thereof. Each of these components may communicate, directly or indirectly, with one another (e.g., via one or more buses).

The communications manager 1020 may support wireless communications at a UE in accordance with examples as disclosed herein. The system information manager 1025 may be configured as or otherwise support a means for receiving, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The preamble parameter manager 1030 may be configured as or otherwise support a means for generating a random access preamble based on the first set of random access preamble parameters or the second set of random access preamble parameters. The preamble manager 1035 may be configured as or otherwise support a means for transmitting the random access preamble to the base station.

In some examples, to support receiving the system information including the first set of random access preamble parameters and the second set of random access preamble parameters, the system information manager 1025 may be configured as or otherwise support a means for receiving, in the system information, an indication of a first set of cyclic shifts for generating random access preambles associated with UEs of the first type and an indication of a second set of cyclic shifts for generating random access preambles associated with UEs of the second type, the second set of cyclic shifts different than the first set of cyclic shifts.

In some examples, each cyclic shift of the second set of cyclic shifts for generating random access preambles associated with UEs of the second type differs from each other cyclic shift of the second set of cyclic shifts by at least a first amount. In some examples, each cyclic shift of the first set of cyclic shifts for generating random access preambles associated with UEs of the first type differs from each other cyclic shift of the first set of cyclic shifts by at least a second amount that is greater than the first amount.

In some examples, to support receiving the system information including the first set of random access preamble parameters and the second set of random access preamble parameters, the system information manager 1025 may be configured as or otherwise support a means for receiving, in the system information, an indication of a first set of frequency resources for transmitting random access preambles associated with UEs of the first type and an indication of a second set of frequency resources for transmitting random access preambles associated with UEs of the second type, the second set of frequency resources different than the first set of frequency resources.

In some examples, to support receiving the system information including the first set of random access preamble parameters and the second set of random access preamble parameters, the system information manager 1025 may be configured as or otherwise support a means for receiving, in the system information, an indication of a first set of time resources for transmitting random access preambles associated with UEs of the first type and an indication of a second set of time resources for transmitting random access preambles associated with UEs of the second type, the second set of time resources different than the first set of time resources.

In some examples, to support receiving the system information including the first set of random access preamble parameters and the second set of random access preamble parameters, the system information manager 1025 may be configured as or otherwise support a means for receiving, in the system information, an indication of a first set of root sequences for generating random access preambles associated with UEs of the first type and an indication of a second set of root sequences for generating random access preambles associated with UEs of the second type, the second set of root sequences different than the first set of root sequences.

In some examples, to support receiving the system information including the first set of random access preamble parameters and the second set of random access preamble parameters, the system information manager 1025 may be configured as or otherwise support a means for receiving, within the system information, a first information element including random access preamble parameters specific to UEs of the first type and a second information element including different random access preamble parameters specific to UEs of the second type.

In some examples, the UEs of the first type may comprise aerial UEs, and the UEs of the second type may comprise terrestrial UEs.

In some examples, an aerial UE may be a UE having an aerial network subscription, a UE located above a threshold height, a UE that communicates with the base station via a beam that satisfies a threshold beam angle, a UE communicating via a random access resource designated for aerial UEs, a UE communicating via a random access resource associated with a synchronization signal block corresponding to a beam that satisfies a threshold beam angle, or any combination thereof. A terrestrial UE may be a non-aerial UE (e.g., a UE that doesn't satisfy one or more criteria for qualifying as an aerial UE).

Additionally, or alternatively, the communications manager 1020 may support wireless communications at a UE in accordance with examples as disclosed herein. In some examples, the system information manager 1025 may be configured as or otherwise support a means for receiving, from a base station, system information including an indication of a location of the base station. The location manager 1040 may be configured as or otherwise support a means for identifying a location of the UE. The timing delay manager 1045 may be configured as or otherwise support a means for transmitting, to the base station, a random access preamble at a time that is based on a distance between the location of the base station and the location of the UE.

In some examples, the timing delay manager 1045 may be configured as or otherwise support a means for transmitting, to the base station, an indication of a first timing delay associated with the time at which the random access preamble is transmitted. In some examples, the TA manager 1050 may be configured as or otherwise support a means for receiving, from the base station, an indication of a timing advance that is based on a combination of the first timing delay and a second timing delay, the second timing delay independent of the time at which the random access preamble is transmitted. In some examples, the uplink signaling manager 1055 may be configured as or otherwise support a means for transmitting, to the base station while in a connected mode, uplink signaling in accordance with the timing advance.

In some examples, the TA manager 1050 may be configured as or otherwise support a means for receiving, from the base station before transmitting the indication of the first timing delay, an indication of an initial timing advance that is based on the second timing delay, where the timing advance includes an updated timing advance received after transmitting the indication of the first timing delay.

In some examples, the preamble manager 1035 may be configured as or otherwise support a means for a first message of a random access procedure includes the random access preamble. In some examples, the TA manager 1050 may be configured as or otherwise support a means for receiving the indication of the initial timing advance includes receiving, from the base station, a second message of the random access procedure that includes the indication of the initial timing advance. In some examples, the timing delay manager 1045 may be configured as or otherwise support a means for transmitting the indication of the first timing delay includes transmitting, to the base station, a third message of the random access procedure that includes the indication of the first timing delay. In some examples, the TA manager 1050 may be configured as or otherwise support a means for receiving the indication of the timing advance includes receiving, from the base station, a fourth message of the random access procedure that includes an indication of the updated timing advance that is based on the combination of the first timing delay and the second timing delay.

In some examples, the preamble manager 1035 may be configured as or otherwise support a means for a first message of a random access procedure includes the random access preamble and the indication of the first timing delay. In some examples, the TA manager 1050 may be configured as or otherwise support a means for receiving the indication of the timing advance includes receiving, from the base station, a second message of the random access procedure that includes the indication of the timing advance that is based on the combination of the first timing delay and the second timing delay.

In some examples, the TA manager 1050 may be configured as or otherwise support a means for receiving, from the base station, an indication of an adjustment factor for the time at which the random access preamble is transmitted, and adjusting the time at which the random access preamble is transmitted based at least in part on the adjustment factor.

In some examples, the system information includes a system information block, a positioning system information block, or any combination thereof.

In some examples, the UE may be an aerial UE that has an aerial network subscription, is located above a threshold height, communicates with the base station via a beam that satisfies a threshold beam angle, communicates via a random access resource designated for aerial UEs, communicates via a random access resource associated with a synchronization signal block corresponding to a beam that satisfies a threshold beam angle, or any combination thereof. A terrestrial UE may be a non-aerial UE. In some examples, the UE may transmit the random access preamble at the time that is based on the distance between the location of the base station and the location of the UE based on the UE being an aerial UE.

Figure 11:
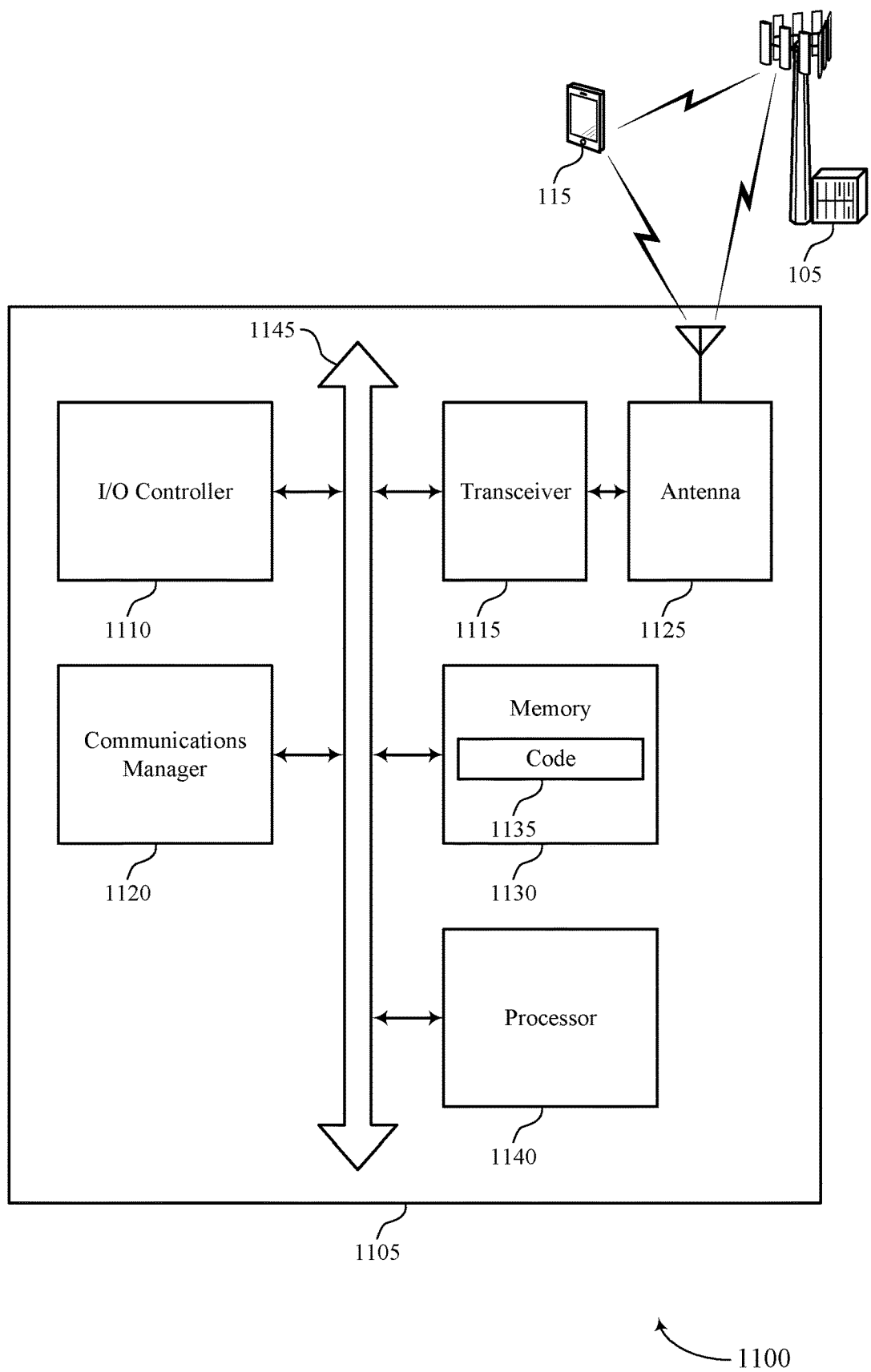
FIG. 11 shows a diagram of a system including a device that supports flexible random access channel configurations in accordance with aspects of the present disclosure.

FIG. 11 shows a diagram of a system 1100 including a device 1105 that supports flexible random access channel configurations in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting flexible random access channel configurations). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The communications manager 1120 may be configured as or otherwise support a means for generating a random access preamble based on the first set of random access preamble parameters or the second set of random access preamble parameters. The communications manager 1120 may be configured as or otherwise support a means for transmitting the random access preamble to the base station.

Additionally or alternatively, the communications manager 1120 may support wireless communications at a UE in accordance with examples as disclosed herein. For example, the communications manager 1120 may be configured as or otherwise support a means for receiving, from a base station, system information including an indication of a location of the base station. The communications manager 1120 may be configured as or otherwise support a means for identifying a location of the UE. The communications manager 1120 may be configured as or otherwise support a means for transmitting, to the base station, a random access preamble at a time that is based on a distance between the location of the base station and the location of the UE.

By including or configuring the communications manager 1120 in accordance with examples as described herein, the device 1105 may support techniques for flexible RACH configurations. Described techniques may result in decreased interference and increase the probability of a successful random access procedure. Described techniques may benefit the system by reducing system latency, reducing power consumption, supporting more efficient utilization of communication resources, improved user experience, etc.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of flexible random access channel configurations as described herein, or the processor 1140 and the memory 1130 may be otherwise configured to perform or support such operations.

Figure 12:
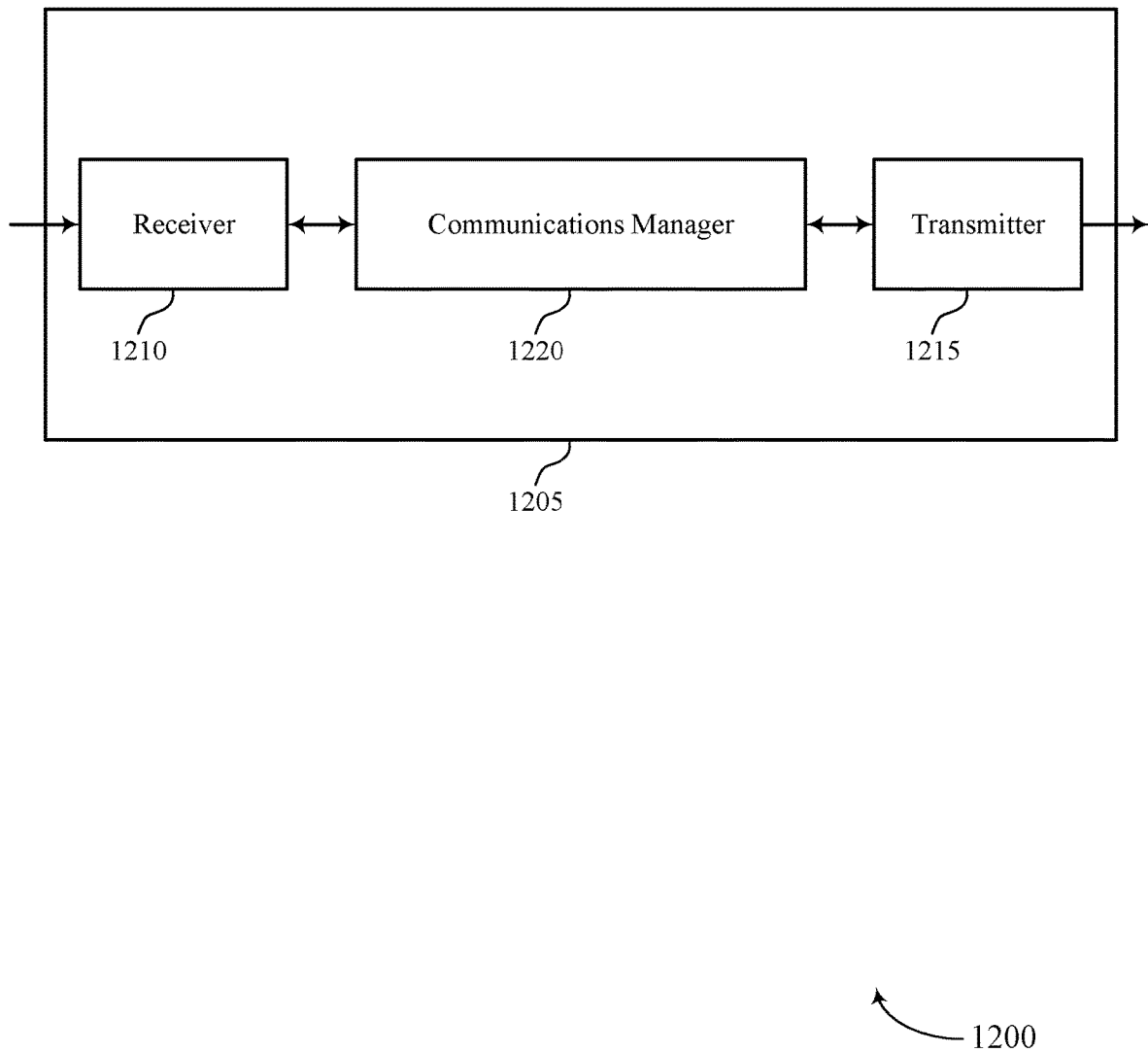
FIGS. 12 and 13 show block diagrams of devices that support flexible random access channel configurations in accordance with aspects of the present disclosure.

FIG. 12 shows a block diagram 1200 of a device 1205 that supports flexible random access channel configurations in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to flexible random access channel configurations). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to flexible random access channel configurations). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of flexible random access channel configurations as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The communications manager 1220 may be configured as or otherwise support a means for receiving, from the UE based on transmitting the system information, a random access preamble based on the first set of random access preamble parameters or the second set of random access preamble parameters. The communications manager 1220 may be configured as or otherwise support a means for transmitting, to the UE, a random access message responsive to the random access preamble.

Additionally, or alternatively, the communications manager 1220 may support wireless communications at a base station in accordance with examples as disclosed herein. For example, the communications manager 1220 may be configured as or otherwise support a means for transmitting, to a UE, system information including an indication of a location of the base station. The communications manager 1220 may be configured as or otherwise support a means for receiving, from the UE, a random access preamble at a time that is based on a distance between the location of the base station and a location of the UE. The communications manager 1220 may be configured as or otherwise support a means for transmitting, to the UE, a random access message responsive to the random access preamble.

By including or configuring the communications manager 1220 in accordance with examples as described herein, the device 1205 (e.g., a processor controlling or otherwise coupled to the receiver 1210, the transmitter 1215, the communications manager 1220, or any combination thereof) may support techniques for flexible RACH configurations. Described techniques may result in decreased interference and increase the probability of a successful random access procedure. Described techniques may benefit the system by reducing system latency, reducing power consumption, supporting more efficient utilization of communication resources, etc.

Figure 13:
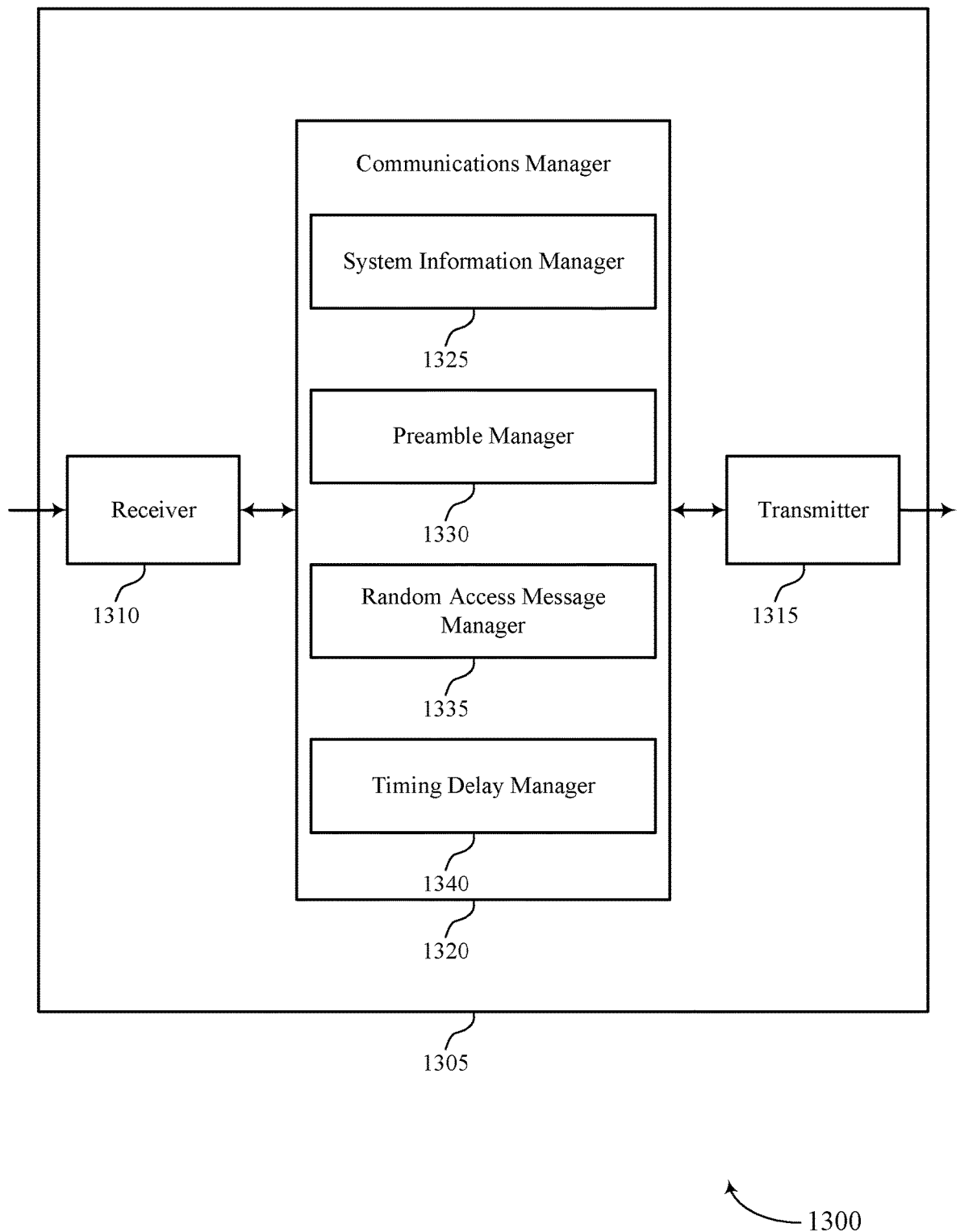

FIG. 13 shows a block diagram 1300 of a device 1305 that supports flexible random access channel configurations in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to flexible random access channel configurations). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to flexible random access channel configurations). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of flexible random access channel configurations as described herein. For example, the communications manager 1320 may include a system information manager 1325, a preamble manager 1330, a random access message manager 1335, a timing delay manager 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The system information manager 1325 may be configured as or otherwise support a means for transmitting, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The preamble manager 1330 may be configured as or otherwise support a means for receiving, from the UE based on transmitting the system information, a random access preamble based on the first set of random access preamble parameters or the second set of random access preamble parameters. The random access message manager 1335 may be configured as or otherwise support a means for transmitting, to the UE, a random access message responsive to the random access preamble.

Additionally, or alternatively, the communications manager 1320 may support wireless communications at a base station in accordance with examples as disclosed herein. The system information manager 1325 may be configured as or otherwise support a means for transmitting, to a UE, system information including an indication of a location of the base station. The timing delay manager 1340 may be configured as or otherwise support a means for receiving, from the UE, a random access preamble at a time that is based on a distance between the location of the base station and a location of the UE. The random access message manager 1335 may be configured as or otherwise support a means for transmitting, to the UE, a random access message responsive to the random access preamble.

Figure 14:
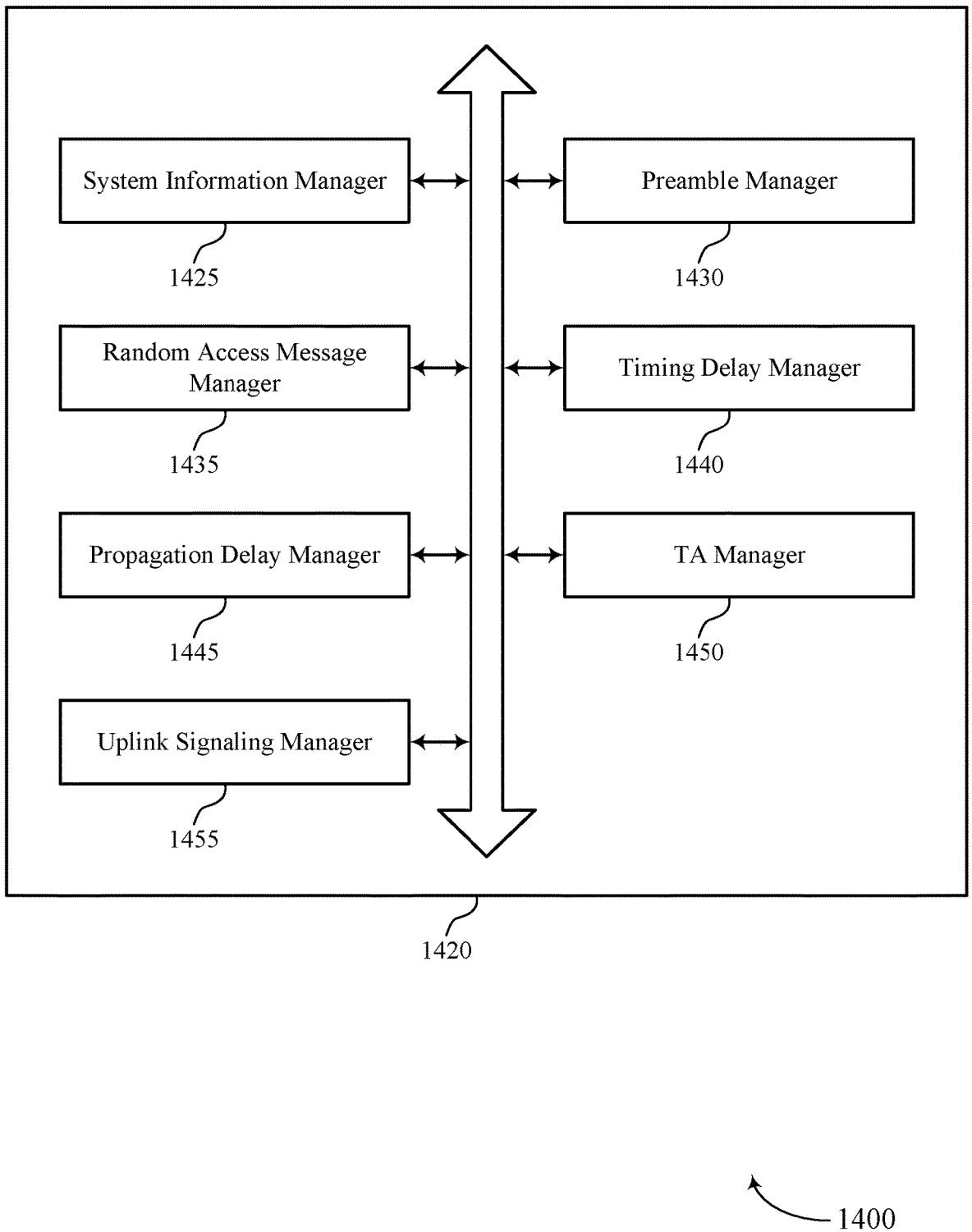
FIG. 14 shows a block diagram of a communications manager that supports flexible random access channel configurations in accordance with aspects of the present disclosure.

FIG. 14 shows a block diagram 1400 of a communications manager 1420 that supports flexible random access channel configurations in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of flexible random access channel configurations as described herein. For example, the communications manager 1420 may include a system information manager 1425, a preamble manager 1430, a random access message manager 1435, a timing delay manager 1440, a propagation delay manager 1445, a TA manager 1450, an uplink signaling manager 1455, or any combination thereof. Each of these components may communicate, directly or indirectly, with one another (e.g., via one or more buses).

The communications manager 1420 may support wireless communications at a base station in accordance with examples as disclosed herein. The system information manager 1425 may be configured as or otherwise support a means for transmitting, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The preamble manager 1430 may be configured as or otherwise support a means for receiving, from the UE based on transmitting the system information, a random access preamble based on the first set of random access preamble parameters or the second set of random access preamble parameters. The random access message manager 1435 may be configured as or otherwise support a means for transmitting, to the UE, a random access message responsive to the random access preamble.

In some examples, to support transmitting the system information including the first set of random access preamble parameters and the second set of random access preamble parameters, the system information manager 1425 may be configured as or otherwise support a means for transmitting, in the system information, an indication of a first set of cyclic shifts for generating random access preambles associated with UEs of the first type and an indication of a second set of cyclic shifts for generating random access preambles associated with UEs of the second type, the second set of cyclic shifts different than the first set of cyclic shifts.

In some examples, each cyclic shift of the second set of cyclic shifts for generating random access preambles associated with UEs of the second type differs from each other cyclic shift of the second set of cyclic shifts by at least a first amount. In some examples, each cyclic shift of the first set of cyclic shifts for generating random access preambles associated with UEs of the first type differs from each other cyclic shift of the first set of cyclic shifts by at least a second amount that is greater than the first amount.

In some examples, to support transmitting the system information including the first set of random access preamble parameters and the second set of random access preamble parameters, the system information manager 1425 may be configured as or otherwise support a means for transmitting, in the system information, an indication of a first set of frequency resources for transmitting random access preambles associated with UEs of the first type and an indication of a second set of frequency resources for transmitting random access preambles associated with UEs of the second type, the second set of frequency resources different than the first set of frequency resources.

In some examples, to support transmitting the system information, the system information manager 1425 may be configured as or otherwise support a means for transmitting, in the system information, an indication of a first set of time resources for transmitting random access preambles associated with UEs of the first type and an indication of a second set of time resources for transmitting random access preambles associated with UEs of the second type, the second set of time resources different than the first set of time resources.

In some examples, to support transmitting the system information including the first set of random access preamble parameters and the second set of random access preamble parameters, the system information manager 1425 may be configured as or otherwise support a means for transmitting, in the system information, an indication of a first set of root sequences for generating random access preambles associated with UEs of the first type and an indication of a second set of root sequences for generating random access preambles associated with UEs of the second type, the second set of root sequences different than the first set of root sequences.

In some examples, to support receiving the system information including the first set of random access preamble parameters and the second set of random access preamble parameters, the system information manager 1425 may be configured as or otherwise support a means for receiving, within the system information, a first information element including random access preamble parameters specific to UEs of the first type and a second information element including different random access preamble parameters specific to UEs of the second type.

In some examples, the UEs of the first type may be aerial UEs, and the UEs of the second type may be terrestrial UEs.

In some examples, an aerial UE may be a UE having an aerial network subscription, a UE located above a threshold height, a UE that communicates with the base station via a beam that satisfies a threshold beam angle, a UE communicating via a random access resource designated for aerial UEs, a UE communicating via a random access resource associated with a synchronization signal block corresponding to a beam that satisfies a threshold beam angle, or any combination thereof. A terrestrial UE may be a non-aerial UE.

Additionally, or alternatively, the communications manager 1420 may support wireless communications at a base station in accordance with examples as disclosed herein. In some examples, the system information manager 1425 may be configured as or otherwise support a means for transmitting, to a UE, system information including an indication of a location of the base station. The timing delay manager 1440 may be configured as or otherwise support a means for receiving, from the UE, a random access preamble at a time that is based on a distance between the location of the base station and a location of the UE. In some examples, the random access message manager 1435 may be configured as or otherwise support a means for transmitting, to the UE, a random access message responsive to the random access preamble.

In some examples, the propagation delay manager 1445 may be configured as or otherwise support a means for estimating a propagation delay for signaling between the base station and the UE based on receiving the random access preamble. In some examples, the timing delay manager 1440 may be configured as or otherwise support a means for receiving, from the UE, an indication of a first timing delay associated with the time at which the random access preamble is received. In some examples, the TA manager 1450 may be configured as or otherwise support a means for transmitting, to the UE, an indication of a timing advance that is based on a combination of the first timing delay and the estimated propagation delay. In some examples, the uplink signaling manager 1455 may be configured as or otherwise support a means for receiving, from the UE, uplink signaling in accordance with the timing advance.

In some examples, the TA manager 1450 may be configured as or otherwise support a means for transmitting, to the UE before receiving the indication of the first timing delay, an indication of an initial timing advance that is based on the estimated propagation delay, where the timing advance includes an updated timing advance transmitted after receiving the indication of the first timing delay.

In some examples, a first message of a random access procedure includes the random access preamble. In some examples, transmitting the indication of the initial timing advance includes transmitting, to the UE, a second message of the random access procedure that includes the indication of the initial timing advance, the second message of the random access procedure including the random access message responsive to the random access preamble. In some examples, receiving the indication of the first timing delay includes receiving, from the UE, a third message of the random access procedure that includes the indication of the first timing delay. In some examples, transmitting the indication of the timing advance includes transmitting, to the UE, a fourth message of the random access procedure that includes the indication of the timing advance that is based on the combination of the first timing delay and the estimated propagation delay.

In some examples, a first message of a random access procedure includes the random access preamble and the indication of the first timing delay. In some examples, transmitting the indication of the timing advance includes transmitting, to the UE, a second message of the random access procedure that includes the indication of the timing advance that is based on the combination of the first timing delay and the estimated propagation delay, the second message of the random access procedure including the random access message responsive to the random access preamble.

In some examples, the TA manager 1450 may be configured as or otherwise support a means for receiving, from the base station, an indication of an adjustment factor for the time at which the random access preamble is transmitted, and adjusting the time at which the random access preamble is transmitted based at least in part on the adjustment factor.

In some examples, the system information includes a system information block, a positioning system information block, or any combination thereof.

In some examples, the UE may be an aerial UE that has an aerial network subscription, is located above a threshold height, communicates with the base station via a beam that satisfies a threshold beam angle, communicates via a random access resource designated for aerial UEs, communicates via a random access resource associated with a synchronization signal block corresponding to a beam that satisfies a threshold beam angle, or any combination thereof.

Figure 15:
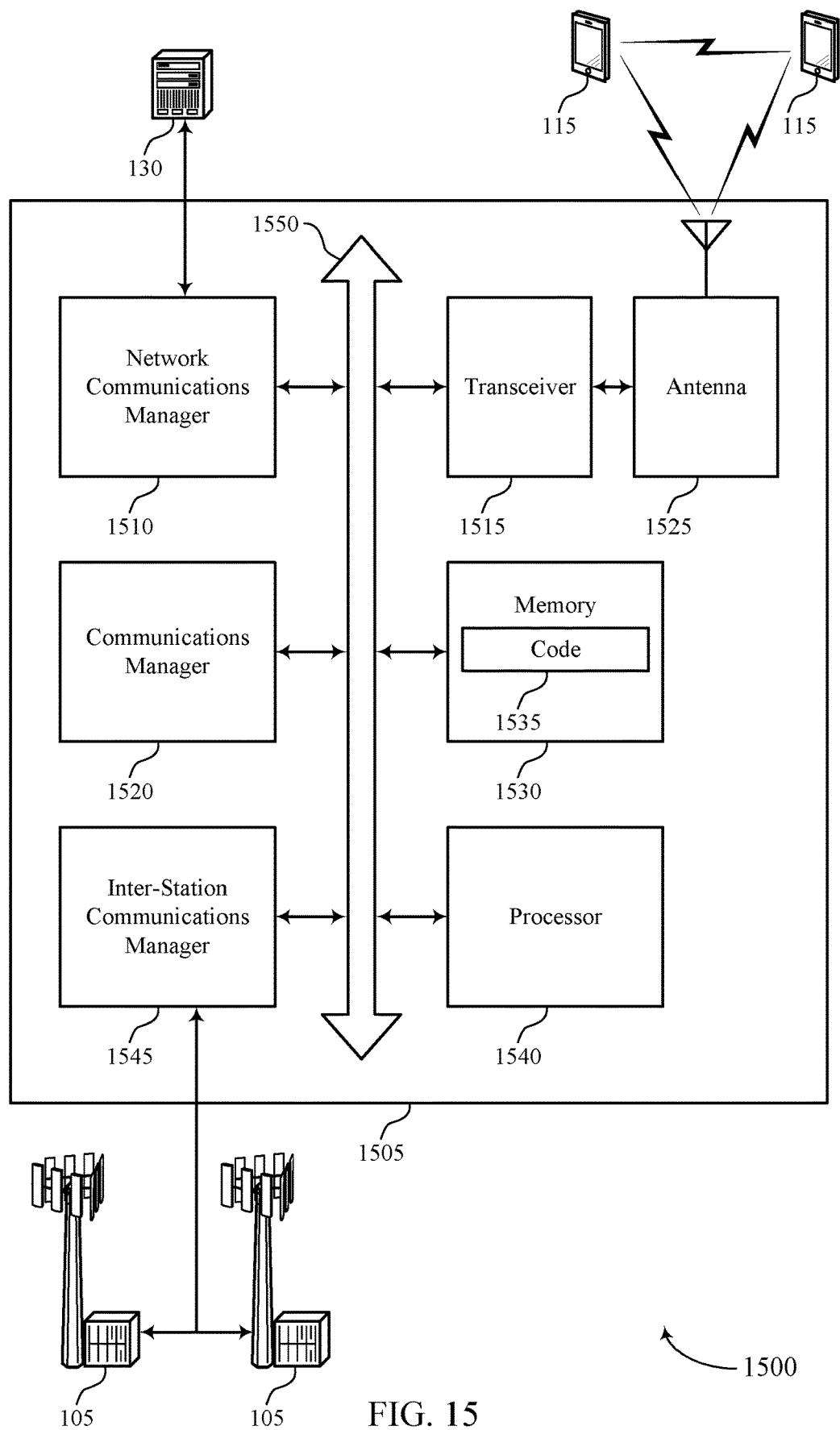
FIG. 15 shows a diagram of a system including a device that supports flexible random access channel configurations in accordance with aspects of the present disclosure.

FIG. 15 shows a diagram of a system 1500 including a device 1505 that supports flexible random access channel configurations in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting flexible random access channel configurations). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The communications manager 1520 may be configured as or otherwise support a means for receiving, from the UE based on transmitting the system information, a random access preamble based on the first set of random access preamble parameters or the second set of random access preamble parameters. The communications manager 1520 may be configured as or otherwise support a means for transmitting, to the UE, a random access message responsive to the random access preamble.

Additionally, or alternatively, the communications manager 1520 may support wireless communications at a base station in accordance with examples as disclosed herein. For example, the communications manager 1520 may be configured as or otherwise support a means for transmitting, to a UE, system information including an indication of a location of the base station. The communications manager 1520 may be configured as or otherwise support a means for receiving, from the UE, a random access preamble at a time that is based on a distance between the location of the base station and a location of the UE. The communications manager 1520 may be configured as or otherwise support a means for transmitting, to the UE, a random access message responsive to the random access preamble.

By including or configuring the communications manager 1520 in accordance with examples as described herein, the device 1505 may support techniques for flexible RACH configurations. Described techniques may result in decreased interference and increase the probability of a successful random access procedure. Described techniques may benefit the system by reducing system latency, reducing power consumption, supporting more efficient utilization of communication resources, improved user experience, etc.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of flexible random access channel configurations as described herein, or the processor 1540 and the memory 1530 may be otherwise configured to perform or support such operations.

Figure 16:
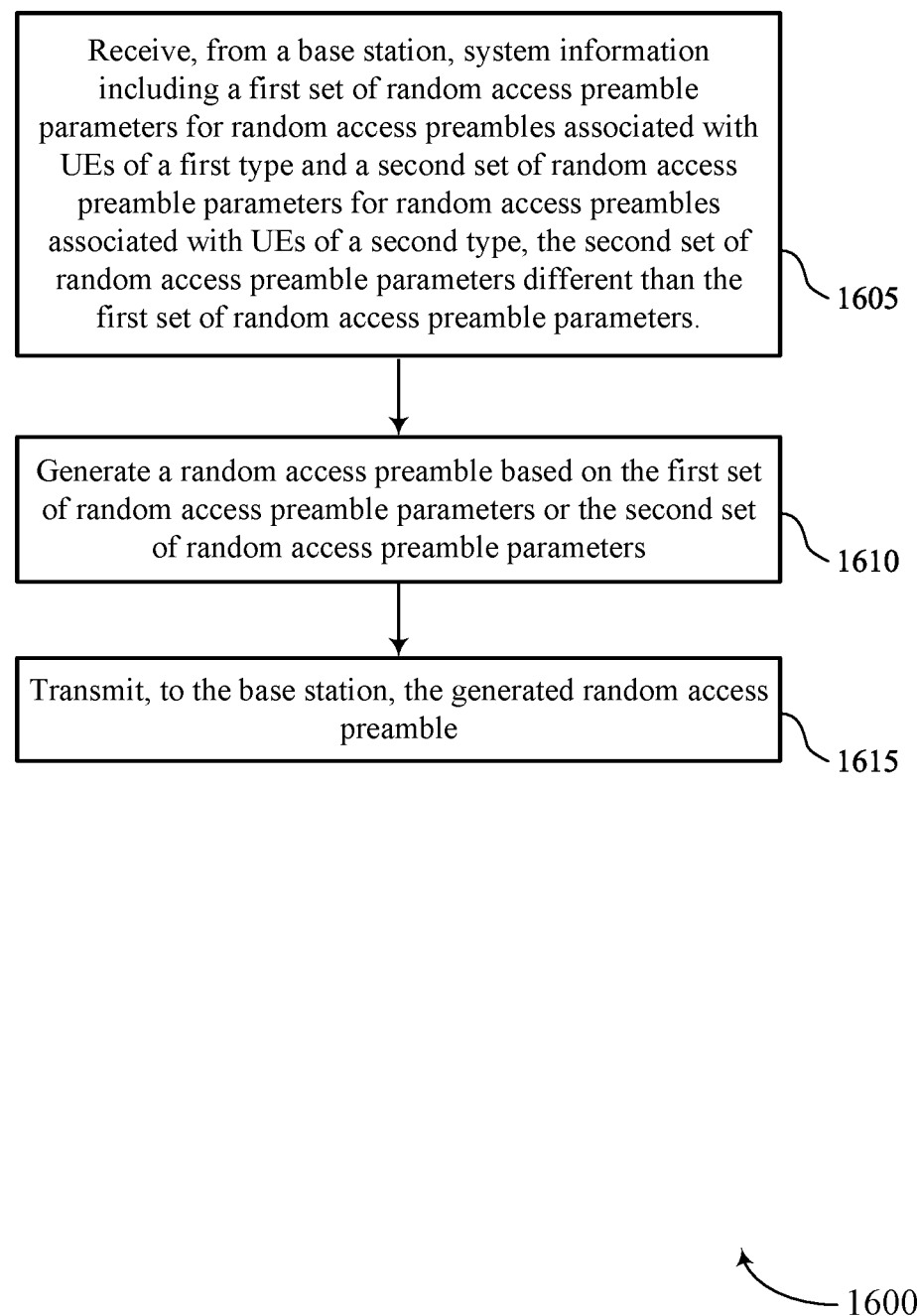
FIGS. 16 through 19 show flowcharts illustrating methods that support flexible random access channel configurations in accordance with aspects of the present disclosure.

FIG. 16 shows a flowchart illustrating a method 1600 that supports flexible random access channel configurations in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The operations of 1605 may be performed in accordance with examples as disclosed herein. In some examples, aspects of the operations of 1605 may be performed by a system information manager 1025 as described with reference to FIG. 10.

At 1610, the method may include generating a random access preamble based on the first set of random access preamble parameters or the second set of random access preamble parameters. The operations of 1610 may be performed in accordance with examples as disclosed herein. In some examples, aspects of the operations of 1610 may be performed by a preamble parameter manager 1030 as described with reference to FIG. 10.

At 1615, the method may include transmitting the random access preamble to the base station. The operations of 1615 may be performed in accordance with examples as disclosed herein. In some examples, aspects of the operations of 1615 may be performed by a preamble manager 1035 as described with reference to FIG. 10.

Figure 17:
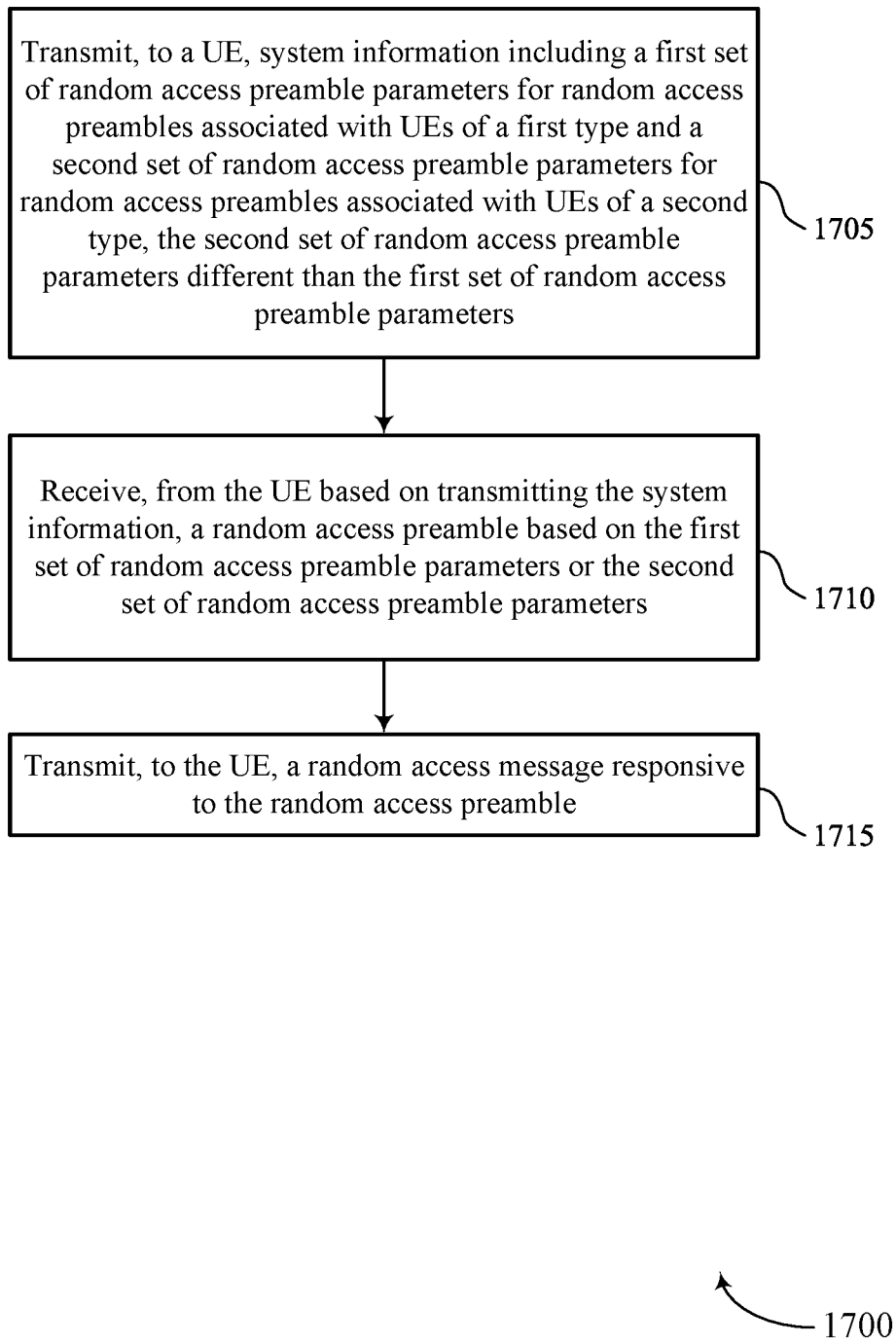

FIG. 17 shows a flowchart illustrating a method 1700 that supports flexible random access channel configurations in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, system information including a first set of random access preamble parameters for random access preambles associated with UEs of a first type and a second set of random access preamble parameters for random access preambles associated with UEs of a second type, the second set of random access preamble parameters different than the first set of random access preamble parameters. The operations of 1705 may be performed in accordance with examples as disclosed herein. In some examples, aspects of the operations of 1705 may be performed by a system information manager 1425 as described with reference to FIG. 14.

At 1710, the method may include receiving, from the UE based on transmitting the system information, a random access preamble based on the first set of random access preamble parameters or the second set of random access preamble parameters. The operations of 1710 may be performed in accordance with examples as disclosed herein. In some examples, aspects of the operations of 1710 may be performed by a preamble manager 1430 as described with reference to FIG. 14.

At 1715, the method may include transmitting, to the UE, a random access message responsive to the random access preamble. The operations of 1715 may be performed in accordance with examples as disclosed herein. In some examples, aspects of the operations of 1715 may be performed by a random access message manager 1435 as described with reference to FIG. 14.

Figure 18:
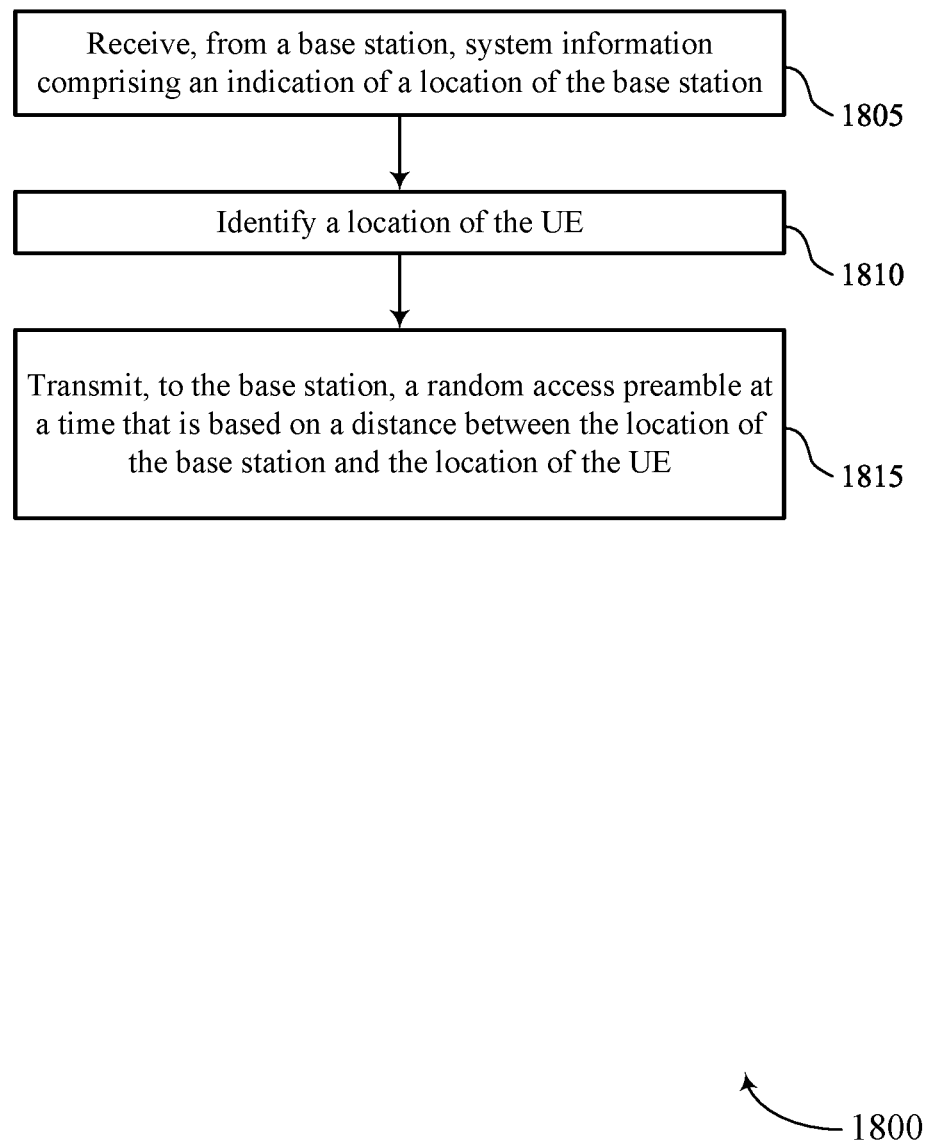

FIG. 18 shows a flowchart illustrating a method 1800 that supports flexible random access channel configurations in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving, from a base station, system information including an indication of a location of the base station. The operations of 1805 may be performed in accordance with examples as disclosed herein. In some examples, aspects of the operations of 1805 may be performed by a system information manager 1025 as described with reference to FIG. 10.

At 1810, the method may include identifying a location of the UE. The operations of 1810 may be performed in accordance with examples as disclosed herein. In some examples, aspects of the operations of 1810 may be performed by a location manager 1040 as described with reference to FIG. 10.

At 1815, the method may include transmitting, to the base station, a random access preamble at a time that is based on a distance between the location of the base station and the location of the UE. The operations of 1815 may be performed in accordance with examples as disclosed herein. In some examples, aspects of the operations of 1815 may be performed by a timing delay manager 1045 as described with reference to FIG. 10.

Figure 19:
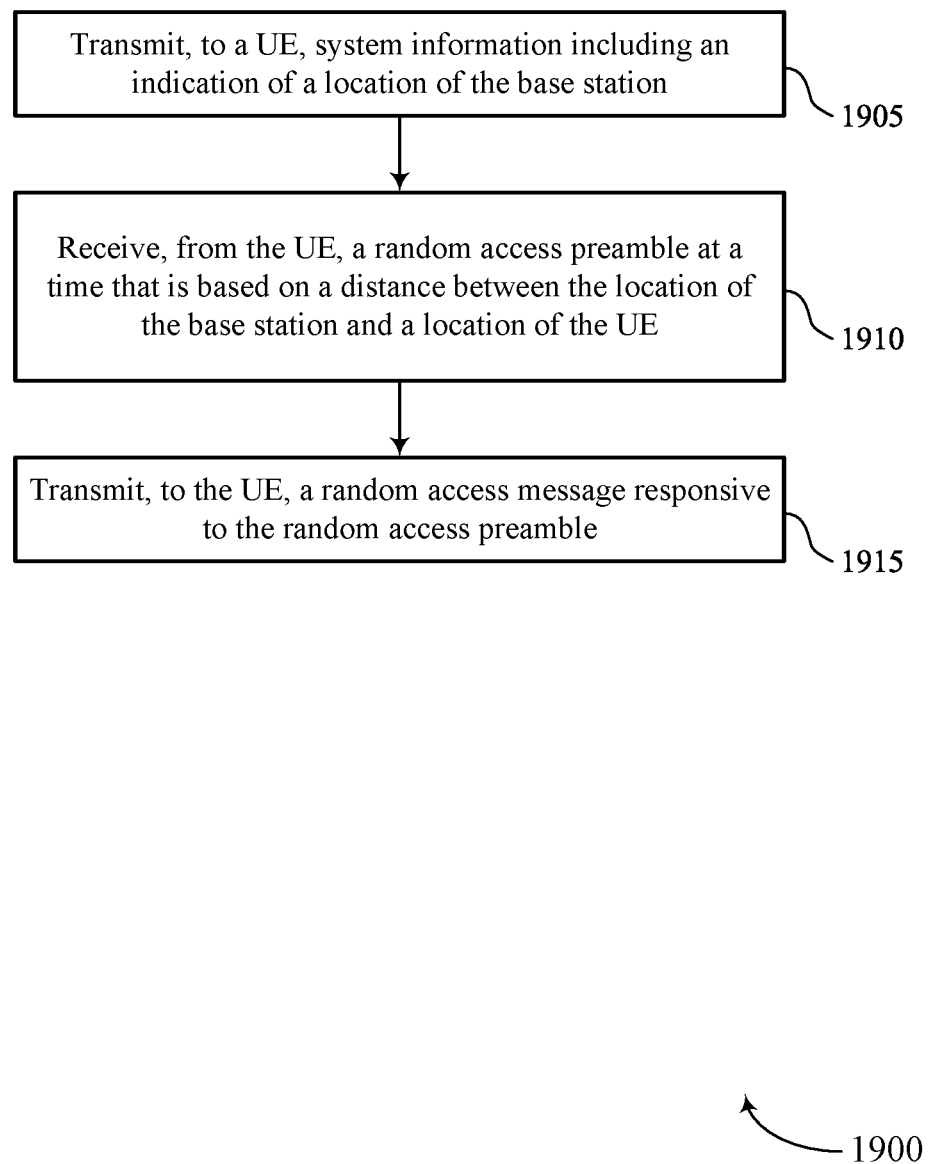

FIG. 19 shows a flowchart illustrating a method 1900 that supports flexible random access channel configurations in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include transmitting, to a UE, system information including an indication of a location of the base station. The operations of 1905 may be performed in accordance with examples as disclosed herein. In some examples, aspects of the operations of 1905 may be performed by a system information manager 1425 as described with reference to FIG. 14.

At 1910, the method may include receiving, from the UE, a random access preamble at a time that is based on a distance between the location of the base station and a location of the UE. The operations of 1910 may be performed in accordance with examples as disclosed herein. In some examples, aspects of the operations of 1910 may be performed by a timing delay manager 1440 as described with reference to FIG. 14.

At 1915, the method may include transmitting, to the UE, a random access message responsive to the random access preamble. The operations of 1915 may be performed in accordance with examples as disclosed herein. In some examples, aspects of the operations of 1915 may be performed by a random access message manager 1435 as described with reference to FIG. 14.

The following provides an overview of aspects of the present disclosure:

Aspect 1: A method for wireless communications at a UE, comprising: receiving, from a base station, system information comprising a first set of random access preamble parameters for random access preambles associated with UEs of a first type and a second set of random access preamble parameters for random access preambles associated with UEs of a second type, the second set of random access preamble parameters different than the first set of random access preamble parameters; generating a random access preamble based at least in part on the first set of random access preamble parameters or the second set of random access preamble parameters; and transmitting the random access preamble to the base station.

Aspect 2: The method of aspect 1, wherein receiving the system information comprising the first set of random access preamble parameters and the second set of random access preamble parameters comprises: receiving, in the system information, an indication of a first set of cyclic shifts for generating random access preambles associated with UEs of the first type and an indication of a second set of cyclic shifts for generating random access preambles associated with UEs of the second type, the second set of cyclic shifts different than the first set of cyclic shifts.

Aspect 3: The method of aspect 2, wherein each cyclic shift of the second set of cyclic shifts for generating random access preambles associated with UEs of the second type differs from each other cyclic shift of the second set of cyclic shifts by at least a first amount; and each cyclic shift of the first set of cyclic shifts for generating random access preambles associated with UEs of the first type differs from each other cyclic shift of the first set of cyclic shifts by at least a second amount that is greater than the first amount.

Aspect 4: The method of any of aspects 1 through 3, wherein receiving the system information comprising the first set of random access preamble parameters and the second set of random access preamble parameters comprises: receiving, in the system information, an indication of a first set of frequency resources for transmitting random access preambles associated with UEs of the first type and an indication of a second set of frequency resources for transmitting random access preambles associated with UEs of the second type, the second set of frequency resources different than the first set of frequency resources.

Aspect 5: The method of any of aspects 1 through 4, wherein receiving the system information comprising the first set of random access preamble parameters and the second set of random access preamble parameters comprises: receiving, in the system information, an indication of a first set of time resources for transmitting random access preambles associated with UEs of the first type and an indication of a second set of time resources for transmitting random access preambles associated with UEs of the second type, the second set of time resources different than the first set of time resources.

Aspect 6: The method of any of aspects 1 through 5, wherein receiving the system information comprising the first set of random access preamble parameters and the second set of random access preamble parameters comprises: receiving, in the system information, an indication of a first set of root sequences for generating random access preambles associated with UEs of the first type and an indication of a second set of root sequences for generating random access preambles associated with UEs of the second type, the second set of root sequences different than the first set of root sequences.

Aspect 7: The method of any of aspects 1 through 6, wherein receiving the system information comprising the first set of random access preamble parameters and the second set of random access preamble parameters comprises: receiving, within the system information, a first information element comprising random access preamble parameters specific to UEs of the first type and a second information element comprising different random access preamble parameters specific to UEs of the second type.

Aspect 8: The method of any of aspects 1 through 7, wherein the UEs of the first type comprise aerial UEs; and the UEs of the second type comprise terrestrial UEs.

Aspect 9: The method of any of aspects 1 through 8, wherein an aerial UE comprises a UE having an aerial network subscription, a UE located above a threshold height, a UE that communicates with the base station via a beam that satisfies a threshold beam angle, a UE communicating via a random access resource designated for aerial UEs, a UE communicating via a random access resource associated with a synchronization signal block corresponding to a beam that satisfies a threshold beam angle, or any combination thereof; and a terrestrial UE comprises a non-aerial UE.

Aspect 10: A method for wireless communications at a base station, comprising: transmitting, to a UE, system information comprising a first set of random access preamble parameters for random access preambles associated with UEs of a first type and a second set of random access preamble parameters for random access preambles associated with UEs of a second type, the second set of random access preamble parameters different than the first set of random access preamble parameters; receiving, from the UE based at least in part on transmitting the system information, a random access preamble based at least in part on the first set of random access preamble parameters or the second set of random access preamble parameters; and transmitting, to the UE, a random access message responsive to the random access preamble.

Aspect 11: The method of aspect 10, wherein transmitting the system information comprising the first set of random access preamble parameters and the second set of random access preamble parameters comprises: transmitting, in the system information, an indication of a first set of cyclic shifts for generating random access preambles associated with UEs of the first type and an indication of a second set of cyclic shifts for generating random access preambles associated with UEs of the second type, the second set of cyclic shifts different than the first set of cyclic shifts.

Aspect 12: The method of aspect 11, wherein each cyclic shift of the second set of cyclic shifts for generating random access preambles associated with UEs of the second type differs from each other cyclic shift of the second set of cyclic shifts by at least a first amount; and each cyclic shift of the first set of cyclic shifts for generating random access preambles associated with UEs of the first type differs from each other cyclic shift of the first set of cyclic shifts by at least a second amount that is greater than the first amount.

Aspect 13: The method of any of aspects 10 through 12, wherein transmitting the system information comprising the first set of random access preamble parameters and the second set of random access preamble parameters comprises: transmitting, in the system information, an indication of a first set of frequency resources for transmitting random access preambles associated with UEs of the first type and an indication of a second set of frequency resources for transmitting random access preambles associated with UEs of the second type, the second set of frequency resources different than the first set of frequency resources.

Aspect 14: The method of any of aspects 10 through 13, wherein transmitting the system information comprises: transmitting, in the system information, an indication of a first set of time resources for transmitting random access preambles associated with UEs of the first type and an indication of a second set of time resources for transmitting random access preambles associated with UEs of the second type, the second set of time resources different than the first set of time resources.

Aspect 15: The method of any of aspects 10 through 14, wherein transmitting the system information comprising the first set of random access preamble parameters and the second set of random access preamble parameters comprises: transmitting, in the system information, an indication of a first set of root sequences for generating random access preambles associated with UEs of the first type and an indication of a second set of root sequences for generating random access preambles associated with UEs of the second type, the second set of root sequences different than the first set of root sequences.

Aspect 16: The method of any of aspects 10 through 15, wherein receiving the system information comprising the first set of random access preamble parameters and the second set of random access preamble parameters comprises: transmitting, within the system information, a first information element comprising random access preamble parameters specific to UEs of the first type and a second information element comprising different random access preamble parameters specific to UEs of the second type.

Aspect 17: A method for wireless communications at a UE, comprising: receiving, from a base station, system information comprising an indication of a location of the base station; identifying a location of the UE; and transmitting, to the base station, a random access preamble at a time that is based at least in part on a distance between the location of the base station and the location of the UE.

Aspect 18: The method of aspect 17, further comprising: transmitting, to the base station, an indication of a first timing delay associated with the time at which the random access preamble is transmitted; receiving, from the base station, an indication of a timing advance that is based at least in part on a combination of the first timing delay and a second timing delay, the second timing delay independent of the time at which the random access preamble is transmitted; and transmitting, to the base station while in a connected mode, uplink signaling in accordance with the timing advance.

Aspect 19: The method of aspect 18, further comprising: receiving, from the base station before transmitting the indication of the first timing delay, an indication of an initial timing advance that is based at least in part on the second timing delay, wherein the timing advance comprises an updated timing advance received after transmitting the indication of the first timing delay.

Aspect 20: The method of aspect 19, further comprising: a first message of a random access procedure comprises the random access preamble; receiving the indication of the initial timing advance comprises receiving, from the base station, a second message of the random access procedure that comprises the indication of the initial timing advance; transmitting the indication of the first timing delay comprises transmitting, to the base station, a third message of the random access procedure that comprises the indication of the first timing delay; and receiving the indication of the timing advance comprises receiving, from the base station, a fourth message of the random access procedure that comprises an indication of the updated timing advance that is based at least in part on the combination of the first timing delay and the second timing delay.

Aspect 21: The method of any of aspects 18 through 20, further comprising: a first message of a random access procedure comprises the random access preamble and the indication of the first timing delay; and receiving the indication of the timing advance comprises receiving, from the base station, a second message of the random access procedure that comprises the indication of the timing advance that is based at least in part on the combination of the first timing delay and the second timing delay.

Aspect 22: The method of any of aspects 17 through 21, further comprising: receiving, from the base station, an indication of an adjustment factor for the time at which the random access preamble is transmitted; and adjusting the time at which the random access preamble is transmitted based at least in part on the adjustment factor.

Aspect 23: The method of any of aspects 17 through 22, wherein the system information comprises a system information block, a positioning system information block, or any combination thereof.

Aspect 24: The method of any of aspects 17 through 23, wherein the UE is an aerial UE that has an aerial network subscription, is located above a threshold height, communicates with the base station via a beam that satisfies a threshold beam angle, communicates via a random access resource designated for aerial UEs, communicates via a random access resource associated with a synchronization signal block corresponding to a beam that satisfies a threshold beam angle, or any combination thereof; and the instructions are executable by the processor to cause the apparatus to transmit the random access preamble at the time that is based at least in part on the distance between the location of the base station and the location of the UE based at least in part on the UE being an aerial UE.

Aspect 25: A method for wireless communications at a base station, comprising: transmitting, to a UE, system information comprising an indication of a location of the base station; receiving, from the UE, a random access preamble at a time that is based at least in part on a distance between the location of the base station and a location of the UE; and transmitting, to the UE, a random access message responsive to the random access preamble.

Aspect 26: The method of aspect 25, further comprising: estimating a propagation delay for signaling between the base station and the UE based at least in part on receiving the random access preamble; and receiving, from the UE, an indication of a first timing delay associated with the time at which the random access preamble is received; transmitting, to the UE, an indication of a timing advance that is based at least in part on a combination of the first timing delay and the estimated propagation delay; receiving, from the UE, uplink signaling in accordance with the timing advance.

Aspect 27: The method of aspect 26, further comprising: transmitting, to the UE before receiving the indication of the first timing delay, an indication of an initial timing advance that is based at least in part on the estimated propagation delay, wherein the timing advance comprises an updated timing advance transmitted after receiving the indication of the first timing delay.

Aspect 28: The method of aspect 27, wherein a first message of a random access procedure comprises the random access preamble; transmitting the indication of the initial timing advance comprises transmitting, to the UE, a second message of the random access procedure that comprises the indication of the initial timing advance, the second message of the random access procedure comprising the random access message responsive to the random access preamble; receiving the indication of the first timing delay comprises receiving, from the UE, a third message of the random access procedure that comprises the indication of the first timing delay; and transmitting the indication of the timing advance comprises transmitting, to the UE, a fourth message of the random access procedure that comprises the indication of the timing advance that is based at least in part on the combination of the first timing delay and the estimated propagation delay.

Aspect 29: The method of any of aspects 26 through 28, wherein a first message of a random access procedure comprises the random access preamble and the indication of the first timing delay; and transmitting the indication of the timing advance comprises transmitting, to the UE, a second message of the random access procedure that comprises the indication of the timing advance that is based at least in part on the combination of the first timing delay and the estimated propagation delay, the second message of the random access procedure comprising the random access message responsive to the random access preamble.

Aspect 30: The method of any of aspects 25 through 29, wherein the system information comprises a system information block, a positioning system information block, or a combination thereof.

Aspect 31: An apparatus for wireless communications at a UE, comprising a processor; memory coupled with the processor; and instructions stored in the memory and executable by the processor to cause the apparatus to perform a method of any of aspects 1 through 9.

Aspect 32: An apparatus for wireless communications at a UE, comprising at least one means for performing a method of any of aspects 1 through 9.

Aspect 33: A non-transitory computer-readable medium storing code for wireless communications at a UE, the code comprising instructions executable by a processor to perform a method of any of aspects 1 through 9.

Aspect 34: An apparatus for wireless communications at a base station, comprising a processor; memory coupled with the processor; and instructions stored in the memory and executable by the processor to cause the apparatus to perform a method of any of aspects 10 through 16.

Aspect 35: An apparatus for wireless communications at a base station, comprising at least one means for performing a method of any of aspects 10 through 16.

Aspect 36: A non-transitory computer-readable medium storing code for wireless communications at a base station, the code comprising instructions executable by a processor to perform a method of any of aspects 10 through 16.

Aspect 37: An apparatus for wireless communications at a UE, comprising a processor; memory coupled with the processor; and instructions stored in the memory and executable by the processor to cause the apparatus to perform a method of any of aspects 17 through 24.

Aspect 38: An apparatus for wireless communications at a UE, comprising at least one means for performing a method of any of aspects 17 through 24.

Aspect 39: A non-transitory computer-readable medium storing code for wireless communications at a UE, the code comprising instructions executable by a processor to perform a method of any of aspects 17 through 24.

Aspect 40: An apparatus for wireless communications at a base station, comprising a processor; memory coupled with the processor; and instructions stored in the memory and executable by the processor to cause the apparatus to perform a method of any of aspects 25 through 30.

Aspect 41: An apparatus for wireless communications at a base station, comprising at least one means for performing a method of any of aspects 25 through 30.

Aspect 42: A non-transitory computer-readable medium storing code for wireless communications at a base station, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions. Also, as used herein, the phase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
a memory; and
at least one processor coupled to the memory, wherein the at least one processor is configured to:
receive, from a network device, system information comprising a first set of random access preamble parameters for random access preambles associated with user equipments (UEs) of a first type and a second set of random access preamble parameters for random access preambles associated with UEs of a second type, wherein the first set of random access preamble parameters comprises a first set of cyclic shifts and the second set of random access preamble parameters comprises a second set of cyclic shifts, the second set of cyclic shifts differs from the first set of cyclic shifts, and each cyclic shift of the second set of cyclic shifts differs from each other cyclic shift of the second set of cyclic shifts by at least a first amount;
generate a random access preamble based at least in part on the first set of cyclic shifts of the first set of random access preamble parameters or the second set of cyclic shifts of the second set of random access preamble parameters; and
transmit the random access preamble to the network device.

2. The apparatus of claim 1, wherein:
each cyclic shift of the first set of cyclic shifts for generation of random access preambles associated with UEs of the first type differs from each other cyclic shift of the first set of cyclic shifts by at least a second amount that is greater than the first amount.

3. The apparatus of claim 1, wherein, to receive the system information comprising the first set of random access preamble parameters and the second set of random access preamble parameters, the at least one processor is configured to:
receive, in the system information, an indication of a first set of frequency resources for transmission of random access preambles associated with UEs of the first type and an indication of a second set of frequency resources for transmission of random access preambles associated with UEs of the second type, the second set of frequency resources different than the first set of frequency resources.

4. The apparatus of claim 1, wherein, to receive the system information comprising the first set of random access preamble parameters and the second set of random access preamble parameters, the at least one processor is configured to:
    receive, in the system information, an indication of a first set of time resources for transmission of random access preambles associated with UEs of the first type and an indication of a second set of time resources for transmission of random access preambles associated with UEs of the second type, the second set of time resources different than the first set of time resources.

5. The apparatus of claim 1, wherein, to receive the system information comprising the first set of random access preamble parameters and the second set of random access preamble parameters, the at least one processor is configured to:
    receive, in the system information, an indication of a first set of root sequences for generation of random access preambles associated with UEs of the first type and an indication of a second set of root sequences for generation of random access preambles associated with UEs of the second type, the second set of root sequences different than the first set of root sequences.

6. The apparatus of claim 1, wherein, to receive the system information comprising the first set of random access preamble parameters and the second set of random access preamble parameters, the at least one processor is configured to:
    receive, within the system information, a first information element comprising random access preamble parameters specific to UEs of the first type and a second information element comprising different random access preamble parameters specific to UEs of the second type.

7. The apparatus of claim 1, wherein:
the UEs of the first type comprise aerial UEs; and
the UEs of the second type comprise terrestrial UEs.

8. The apparatus of claim 7, wherein:
an aerial UE comprises a UE with an aerial network subscription, a UE located above a threshold height, a UE operable to communicate with the network device via a beam that satisfies a threshold beam angle, a UE operable to communicate via a random access resource designated for aerial UEs, a UE operable to communicate via a random access resource associated with a synchronization signal block corresponding to a beam that satisfies a threshold beam angle, or any combination thereof; and
a terrestrial UE comprises a non-aerial UE.

9. An apparatus for wireless communications, comprising:
a memory; and
at least one processor coupled to the memory, wherein the at least one processor is configured to:
    transmit, to a user equipment (UE), system information comprising a first set of random access preamble parameters for random access preambles associated with UEs of a first type and a second set of random access preamble parameters for random access preambles associated with UEs of a second type, wherein the first set of random access preamble parameters comprises a first set of cyclic shifts and the second set of random access preamble parameters comprises a second set of cyclic shifts, the second set of cyclic shifts differs from the first set of cyclic shifts, and each cyclic shift of the second set of cyclic shifts differs from each other cyclic shift of the second set of cyclic shifts by at least a first amount;
    receive, from the UE based at least in part on transmission of the system information, a random access preamble based at least in part on the first set of cyclic shifts of the first set of random access preamble parameters or the second set of cyclic shifts of the second set of random access preamble parameters; and
    transmit, to the UE, a random access message responsive to the random access preamble.

10. The apparatus of claim 9, wherein:
each cyclic shift of the first set of cyclic shifts for generation of random access preambles associated with UEs of the first type differs from each other cyclic shift of the first set of cyclic shifts by at least a second amount that is greater than the first amount.

11. The apparatus of claim 9, wherein, to transmit the system information comprising the first set of random access preamble parameters and the second set of random access preamble parameters, the at least one processor is configured to:
    transmit, in the system information, an indication of a first set of frequency resources for transmission of random access preambles associated with UEs of the first type and an indication of a second set of frequency resources for transmission of random access preambles associated with UEs of the second type, the second set of frequency resources different than the first set of frequency resources.

12. The apparatus of claim 9, wherein, to transmit the system information comprising the first set of random access preamble parameters and the second set of random access preamble parameters, the at least one processor is configured to:
    transmit, in the system information, an indication of a first set of time resources for transmission of random access preambles associated with UEs of the first type and an indication of a second set of time resources for transmission of random access preambles associated with UEs of the second type, the second set of time resources different than the first set of time resources.

13. The apparatus of claim 9, wherein, to transmit the system information comprising the first set of random access preamble parameters and the second set of random access preamble parameters, the at least one processor is configured to:
    transmit, in the system information, an indication of a first set of root sequences for generation of random access preambles associated with UEs of the first type and an indication of a second set of root sequences for generation of random access preambles associated with UEs of the second type, the second set of root sequences different than the first set of root sequences.

14. The apparatus of claim 9, wherein, to transmit the system information comprising the first set of random access preamble parameters and the second set of random access preamble parameters, the at least one processor is configured to:
    transmit, within the system information, a first information element comprising random access preamble parameters specific to UEs of the first type and a second information element comprising different random access preamble parameters specific to UEs of the second type.

15. A method of wireless communications, comprising:
receiving, from a network device, system information comprising a first set of random access preamble parameters for random access preambles associated with user equipments (UEs) of a first type and a second set of random access preamble parameters for random access preambles associated with UEs of a second type, wherein the first set of random access preamble parameters comprises a first set of cyclic shifts and the second set of random access preamble parameters comprises a second set of cyclic shifts, the second set of cyclic shifts differs from the first set of cyclic shifts, and each cyclic shift of the second set of cyclic shifts differs from each other cyclic shift of the second set of cyclic shifts by at least a first amount;
generating a random access preamble based at least in part on the first set of cyclic shifts of the first set of random access preamble parameters or the second set of cyclic shifts of the second set of random access preamble parameters; and
transmitting the random access preamble to the network device.

16. The method of claim 15, wherein:
each cyclic shift of the first set of cyclic shifts for generating random access preambles associated with UEs of the first type differs from each other cyclic shift of the first set of cyclic shifts by at least a second amount that is greater than the first amount.

17. The method of claim 15, wherein receiving the system information comprising the first set of random access preamble parameters and the second set of random access preamble parameters comprises:
receiving, in the system information, an indication of a first set of frequency resources for transmitting random access preambles associated with UEs of the first type and an indication of a second set of frequency resources for transmitting random access preambles associated with UEs of the second type, the second set of frequency resources different than the first set of frequency resources.

18. The method of claim 15, wherein receiving the system information comprising the first set of random access preamble parameters and the second set of random access preamble parameters comprises:
receiving, in the system information, an indication of a first set of time resources for transmitting random access preambles associated with UEs of the first type and an indication of a second set of time resources for transmitting random access preambles associated with UEs of the second type, the second set of time resources different than the first set of time resources.

19. The method of claim 15, wherein receiving the system information comprising the first set of random access preamble parameters and the second set of random access preamble parameters comprises:
receiving, in the system information, an indication of a first set of root sequences for generating random access preambles associated with UEs of the first type and an indication of a second set of root sequences for generating random access preambles associated with UEs of the second type, the second set of root sequences different than the first set of root sequences.

20. The method of claim 15, wherein receiving the system information comprising the first set of random access preamble parameters and the second set of random access preamble parameters comprises:
receiving, within the system information, a first information element comprising random access preamble parameters specific to UEs of the first type and a second information element comprising different random access preamble parameters specific to UEs of the second type.

21. A method of wireless communications, comprising:
transmitting, to a user equipment (UE), system information comprising a first set of random access preamble parameters for random access preambles associated with UEs of a first type and a second set of random access preamble parameters for random access preambles associated with UEs of a second type, wherein the first set of random access preamble parameters comprises a first set of cyclic shifts and the second set of random access preamble parameters comprises a second set of cyclic shifts, the second set of cyclic shifts differs from the first set of cyclic shifts, and each cyclic shift of the second set of cyclic shifts differs from each other cyclic shift of the second set of cyclic shifts by at least a first amount;
receiving, from the UE based at least in part on transmitting the system information, a random access preamble based at least in part on the first set of cyclic shifts of the first set of random access preamble parameters or the second set of cyclic shifts of the second set of random access preamble parameters; and
transmitting, to the UE, a random access message responsive to the random access preamble.

22. The method of claim 21, wherein:
each cyclic shift of the first set of cyclic shifts for generating random access preambles associated with UEs of the first type differs from each other cyclic shift of the first set of cyclic shifts by at least a second amount that is greater than the first amount.

23. The method of claim 21, wherein transmitting the system information comprising the first set of random access preamble parameters and the second set of random access preamble parameters comprises:
transmitting, in the system information, an indication of a first set of frequency resources for transmitting random access preambles associated with UEs of the first type and an indication of a second set of frequency resources for transmitting random access preambles associated with UEs of the second type, the second set of frequency resources different than the first set of frequency resources.

24. The method of claim 21, wherein transmitting the system information comprises:
transmitting, in the system information, an indication of a first set of time resources for transmitting random access preambles associated with UEs of the first type and an indication of a second set of time resources for transmitting random access preambles associated with UEs of the second type, the second set of time resources different than the first set of time resources.

25. The method of claim 21, wherein transmitting the system information comprising the first set of random access preamble parameters and the second set of random access preamble parameters comprises:
transmitting, in the system information, an indication of a first set of root sequences for generating random access preambles associated with UEs of the first type and an indication of a second set of root sequences for generating random access preambles associated with UEs of the second type, the second set of root sequences different than the first set of root sequences.

26. The method of claim 21, wherein receiving the system information comprising the first set of random access preamble parameters and the second set of random access preamble parameters comprises:

transmitting, within the system information, a first information element comprising random access preamble parameters specific to UEs of the first type and a second information element comprising different random access preamble parameters specific to UEs of the second type.

* * * * *